United States Patent
Jeong et al.

(10) Patent No.: US 9,664,912 B2
(45) Date of Patent: May 30, 2017

(54) IMAGE DISPLAY AND LIQUID CRYSTAL LENS THEREFOR

(71) Applicant: Samsung Display Co., Ltd., Yongin, Gyeonggi-Do (KR)

(72) Inventors: Seung Jun Jeong, Hwaseong-si (KR); Il-Joo Kim, Hwaseong-si (KR); Hyun Seung Seo, Anyang-si (KR); Jin Hwan Kim, Suwon-si (KR); Hae Young Yun, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 164 days.

(21) Appl. No.: 14/138,363

(22) Filed: Dec. 23, 2013

(65) Prior Publication Data

US 2014/0111715 A1    Apr. 24, 2014

(30) Foreign Application Priority Data

Feb. 13, 2013 (KR) .................... 10-2013-0015425

(51) Int. Cl.
*G02F 1/1335* (2006.01)
*G02B 27/22* (2006.01)
(Continued)

(52) U.S. Cl.
CPC ......... *G02B 27/2214* (2013.01); *G02B 27/26* (2013.01); *G02F 1/134309* (2013.01);
(Continued)

(58) Field of Classification Search
CPC .............. G02B 27/2214; G02B 27/26; H04N 13/0404; H04N 13/0406; H04N 13/0452; G02F 1/134309; G02F 2001/294
(Continued)

(56) References Cited

U.S. PATENT DOCUMENTS 8,045,070 B2  10/2011  Park et al.
2007/0296911 A1  12/2007  Hong
(Continued)

FOREIGN PATENT DOCUMENTS

EP    2472885 A2   7/2012
JP    2011048235 A   3/2011
(Continued)

OTHER PUBLICATIONS

McManamon, P.F., "A Review of Phased Array Steering for Narrow-Band Electrooptical Systems", Proceedings of the IEEE, Jun. 2009, vol. 97, No. 6, pp. 1078-1096.

*Primary Examiner* — Nathanael R Briggs
*Assistant Examiner* — William Peterson
(74) *Attorney, Agent, or Firm* — Cantor Colburn LLP

(57) ABSTRACT

A three-dimensional ("3D") image display device includes a display panel, and a liquid crystal lens part disposed on the display panel and which selectively provides a two-dimensional ("2D") image and a 3D stereoscopic image, where the liquid crystal lens part includes: a lower substrate including a plurality of linear electrodes which are disposed in different layers; an upper substrate including a plate electrode; and a lens liquid crystal layer disposed between the lower substrate and the upper substrate, where the linear electrodes in the different layers are alternately arranged in a unit zone of the liquid crystal lens part, and where two adjacent linear electrodes of the linear electrodes are spaced apart from each other when viewed from a top view.

28 Claims, 28 Drawing Sheets

(51) Int. Cl.
*G02B 27/26* (2006.01)
*H04N 13/04* (2006.01)
*G02F 1/1343* (2006.01)
*G02F 1/29* (2006.01)

(52) U.S. Cl.
CPC .... *G02F 2001/294* (2013.01); *H04N 13/0404* (2013.01); *H04N 13/0452* (2013.01)

(58) Field of Classification Search
USPC .......................................................... 349/15
See application file for complete search history.

(56) References Cited

U.S. PATENT DOCUMENTS

| | | |
|---|---|---|
| 2011/0096252 A1 | 4/2011 | Im |
| 2011/0310320 A1 | 12/2011 | Takahashi et al. |
| 2012/0075434 A1 | 3/2012 | Kim et al. |
| 2012/0154556 A1 | 6/2012 | An et al. |
| 2012/0162550 A1* | 6/2012 | Jeong ................. H04N 13/0404 349/15 |
| 2012/0162592 A1* | 6/2012 | Takagi ............... G02B 27/2214 349/139 |
| 2012/0236043 A1 | 9/2012 | Jung et al. |
| 2012/0300042 A1 | 11/2012 | Yun et al. |

FOREIGN PATENT DOCUMENTS

| | | |
|---|---|---|
| KR | 1020090004006 A | 1/2009 |
| KR | 1020100013179 A | 2/2010 |
| KR | 1020110104701 A | 9/2011 |
| KR | 1020120017308 A | 2/2012 |
| KR | 1020120030867 A | 3/2012 |
| KR | 1020130046116 A | 5/2013 |

\* cited by examiner

IMAGE DISPLAY AND LIQUID CRYSTAL LENS THEREFOR

This application claims priority to Korean Patent Application No. 10-2013-0015425 filed on Feb. 13, 2013, and all the benefits accruing therefrom under 35 U.S.C. §119, the contents of which in its entirety is herein incorporated by reference.

BACKGROUND (a) Field

The invention relates to an image display and a liquid crystal lens for the 3D image display.

(b) Description of the Related Art

Generally, a 3D image is recognized by a principle of stereoscopic vision through two eyes, and binocular parallax, that is, a binocular disparity due to the distance between two eyes, which are spaced apart from each other by about 65 mm, may be used for realizing a 3D effect. That is, left and right eyes watch different two-dimensional ("2D") images, respectively, and when the two images are transferred to a brain through a retina, the brain reproduces depth perception and reality of an original 3D image by accurately fusing the two images. This is generally called stereography.

The 3D image display device uses the binocular disparity, and is typically classified into various types including a stereoscopic type, such as a polarization type and a time division type, and an autostereoscopic type, such as a parallax-barrier type, a lenticular type and a blinking light type, according to whether or not an observer wears separate glasses.

In a stereoscopic type 3D image display device, the polarization spectacles or liquid crystal shutter spectacles are used to display a 3D image, and the stereoscopic schemes are typically used in movie theatres.

In an autostereoscopic type 3D image display device, the additional glasses are not used when viewing the stereoscopic image, and various methods for displaying 3D image using the autostereoscopic type 3D image display device have developed.

Among the 3D display devices of the autostereoscopic type, the display device using the lenticular lens is widely used and developed. In the display device using the lenticular lens, the light emitted from the display panel is refracted while passing through the lenticular lens of the lenticular lens unit and a polymer such that progressing direction of the light is divided and incident to two eyes, respectively, while again passing through a switching unit and a polarizer, thereby realizing the stereoscopic display. Here, the light incident to the right eye and the light incident to the left eye have different information such that the stereoscopic image is recognized. In the stereoscopic display device using the lenticular lens, a black matrix between color filters may be recognized at a particular position such that a moiré phenomenon may occur.

SUMMARY

Exemplary embodiments of the invention relate to a three-dimensional ("3D") image display device and a liquid crystal lens for the 3D image display device that switches a two-dimensional ("2D") image and a 3D image by controlling liquid crystal molecules, in which crosstalk of the 3D image display is substantially reduced, thereby substantially improving display quality of the #d image display device.

An exemplary embodiment of a 3D image display device includes a display panel, and a liquid crystal lens part disposed on the display panel and which selectively provides a 2D image and a 3D stereoscopic image. In such an embodiment, the liquid crystal lens part includes: a lower substrate including a plurality of linear electrodes which are disposed in different layers; an upper substrate including a plate electrode; and a lens liquid crystal layer disposed between the lower substrate and the upper substrate, where the linear electrodes in the different layers are alternately arranged in a unit zone of the liquid crystal lens part, and where two adjacent linear electrodes of the linear electrodes are spaced apart from each other when viewed from a top view.

Another exemplary embodiment of a liquid crystal lens for a 3D image display device includes: a lower substrate including a plurality of linear electrodes which are disposed in different layers; an upper substrate including a plate electrode; and a lens liquid crystal layer disposed between the lower substrate and the upper substrate, where the linear electrodes in the different layers are alternately arranged in a unit zone of the liquid crystal lens part, and where two adjacent linear electrodes of the linear electrodes are spaced apart from each other when viewed from a top view.

In an exemplary embodiment, the two adjacent linear electrodes may be spaced apart from each other at a first interval when viewed from the top view, and the two adjacent linear electrodes spaced apart from each other may be disposed opposite to each other with respect to a boundary of adjacent unit zones.

In an exemplary embodiment, the first interval may be less than a cell gap of the lens liquid crystal layer.

In an exemplary embodiment, an interval between the boundary of the adjacent zones and a position of a maximum refractive index in the unit zone may be increased by the two adjacent linear electrodes spaced apart from each other at the first interval when viewed from the top view.

In an exemplary embodiment, the lower substrate of the liquid crystal lens part may further include a lower polarizer, the upper substrate of the liquid crystal lens part may further include an upper polarizer, the lens liquid crystal layer may include lens liquid crystal molecules, and an angle between a direction of the lens liquid crystal molecules aligned by the lower polarizer and a direction of the lens liquid crystal molecules aligned by the upper polarizer may be greater than zero (0).

In an exemplary embodiment, when the angle between the direction of the lens liquid crystal molecules aligned by the lower polarizer and the direction of the lens liquid crystal molecules aligned by the upper polarizer may be referred as a lens inclination, and a phase difference per horizontal distance may be referred to as a phase inclination, the first interval in a unit zone corresponding to a left lens formed by the liquid crystal lens part may be substantially slowly decreased as the phase inclination becomes larger when the lens inclination is greater than a predetermined value, the first interval in the unit zone corresponding to the left lens may be substantially rapidly decreased as the phase inclination becomes larger when the lens inclination is less than the predetermined value, the first interval in a unit zone corresponding to a right lens formed by the liquid crystal lens part may be substantially slowly decreased as the phase inclination becomes larger when the lens inclination is less than the predetermined value, and the first interval in the unit zone corresponding to the right lens may become sharply smaller as the phase inclination becomes larger when the lens inclination is greater than the predetermined value.

In an exemplary embodiment, in the left lens, a maximum value of the first interval in the unit zone corresponding to the left lens may increase as the lens inclination of the left lens increases, and a maximum value of the first interval in the unit zone corresponding to the right lens may decrease as the lens inclination of the right lens increases.

In an exemplary embodiment, the lower substrate of the liquid crystal lens part may further include a lower polarizer, the upper substrate of the liquid crystal lens part may further include an upper polarizer, the lens liquid crystal layer may include lens liquid crystal molecules, and an angle between a direction of the lens liquid crystal molecules aligned by the lower polarizer and a direction of the lens liquid crystal molecules aligned by the upper polarizer may be substantially equal to zero (0).

In an exemplary embodiment, a minimum phase formation electrode and a second minimum phase formation electrode of the linear electrodes in the unit zone may be spaced apart from each other at a second interval.

In an exemplary embodiment, the linear electrodes may extend in a direction inclined with respect to a pixel arrangement direction of the display panel.

In an exemplary embodiment, the liquid crystal lens part may further include a plurality of voltage application wires disposed in a non-display area, and each of the linear electrodes may have a portion extending in a direction substantially perpendicular to the pixel arrangement direction in the non-display area of the liquid crystal lens part.

In an exemplary embodiment, each of the voltage application wires may be connected to a corresponding linear electrode of the linear electrodes.

In an exemplary embodiment, the liquid crystal lens part may further include a cell gap control layer disposed on the lower substrate and having inconstant thickness, and a cell gap of the lens liquid crystal layer may be defined by the cell gap control layer.

In an exemplary embodiment, the cell gap may be greater than two times a cell gap where diffraction efficiency of the liquid crystal lens part is substantially maximum.

In an exemplary embodiment, a cell gap of the lens liquid crystal layer may be substantially constant, and the cell gap of the lens liquid crystal layer may be determined such that an average of diffraction efficiency value based on a weight value which is a product of the transmittance and an area ratio of each unit zone is substantially maximum.

In exemplary embodiments, as described above, by providing an interval between the electrodes that generate the electric field for controlling the liquid crystal molecules of the liquid crystal lens, the change of the phase difference provided by the liquid crystal molecules is substantially constant such that the lens characteristic (for example, the diffraction efficiency) is substantially improved and the crosstalk is substantially reduced, thereby improving the display quality of the 3D image. In such embodiments, when the cell gap of the liquid crystal lens may be determined to improve the diffraction efficiency of the liquid crystal lens such that the lens characteristic (for example, the diffraction efficiency) is improved and the crosstalk is substantially reduced, thereby improving the display quality of the 3D image.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
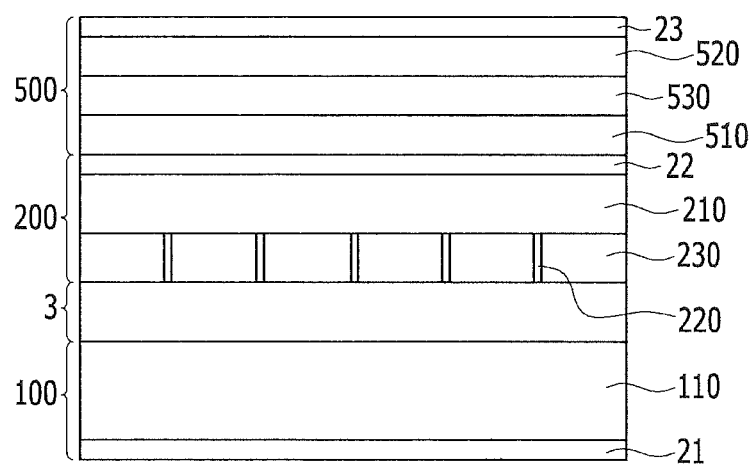
FIG. 1 is a schematic cross-sectional view of an exemplary embodiment of a three-dimensional ("3D") image display device according the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

Hereinafter, an exemplary embodiment of a three-dimensional ("3D") image display device according to the invention will be described with reference to FIG. 1.

FIG. 1 is a schematic cross-sectional view of an exemplary embodiment of a 3D image display device according to the invention.

An exemplary embodiment of the 3D image display device includes a display panel and a liquid crystal lens part 500 as shown in FIG. 1.

The display panel includes a lower panel 100 (also referred to as a "thin film transistor array panel"), a liquid crystal layer 3 and an upper panel 200 (also referred to as a "color filter display panel").

The lower panel 100 includes an insulation substrate 110, a gate line that transmits a gate signal, a data line that transmits a data voltage, a switching element (e.g., a thin film transistor) connected to the gate line and the data line, and a pixel electrode connected to an output terminal of the thin film transistor, and a lower polarizer 21 is disposed on the insulation substrate 110, e.g., attached to a rear surface of the insulation substrate 110.

In an exemplary embodiment, the upper panel 200 includes an insulation substrate 210, a black matrix 220 having a lattice structure with an opening, a color filter 230 disposed in the opening, and a common electrode (not shown) disposed on the black matrix 220 and the color filter 230, and an upper polarizer 22 is disposed on the upper panel 200, e.g., attached to a rear surface of the upper panel 200.

The liquid crystal layer 3 is positioned between the lower panel 100 and the upper panel 200, and an alignment direction of the liquid crystal layer 3 is changed by an electric field generated between the common electrode and the pixel electrode. In an exemplary embodiment, as shown in FIG. 1, the display panel may be a liquid crystal display, but not being limited thereto. In an alternative exemplary embodiment, the display panel may be one of various types of flat display panel, e.g., a plasma display panel, a light emitting diode ("LED") display panel and an electrophoretic display panel. In an exemplary embodiment, the color filter may be omitted.

In an exemplary embodiment, the display panel may be configured to display a two-dimensional ("2D") image, and a 3D stereoscopic image may be displayed by the liquid crystal lens part 500. The liquid crystal lens part 500 selectively displays the 2D image and the 3D stereoscopic image. The liquid crystal lens part 500 is referred to as a switchable zone plate.

The liquid crystal lens part 500 includes a lower substrate 510, an upper substrate 520, a lens liquid crystal layer 530 disposed between two substrates 510 and 520, and a polarizer 23 disposed on the upper substrate 520, e.g., attached outside the upper substrate 520. In an exemplary embodiment, the polarizer 23 may convert a polarization state of the light emitted from the 3D image display device to have a single predetermined polarization direction to improve the display quality. In an alternative exemplary embodiment, the polarizer 23 may be omitted.

Hereinafter, an exemplary embodiment of the liquid crystal lens part 500 according to the invention will be described in detail with reference to FIGS. 2 and 3.

Figure 2:
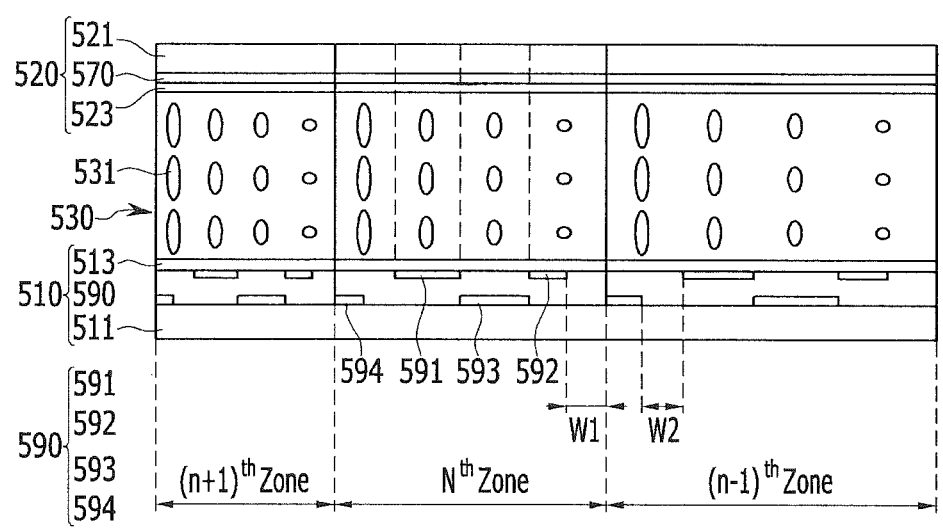
FIG. 2 is a cross-sectional view of an exemplary embodiment of a liquid crystal lens part according to the invention.

FIG. 2 is a cross-sectional view of an exemplary embodiment of a liquid crystal lens part according to the invention.

In an exemplary embodiment, as described above, the polarizer 23 is omitted, as shown in FIG. 2.

The lower substrate 510 of the liquid crystal lens part 500 includes a first insulation substrate 511, and a linear electrode 590 and a lower alignment layer 513 disposed on the first insulation substrate 511.

The linear electrodes 590 include two layers of electrodes, e.g., lower linear electrodes 593 and 594 disposed in a first layer, and upper linear electrodes 591 and 592 disposed in a second layer above the first layer. An insulating layer is disposed between the lower linear electrodes 593 and 594 and the upper linear electrodes 591 and 592 to insulate the linear electrodes 590 from each other. The lower linear electrodes 593 and 594 and the upper linear electrodes 591 and 592 define a unit zone. In an exemplary embodiment, as shown in FIG. 2, the unit zone includes four linear electrodes, but not being limited thereto. In an alternative exemplary embodiment, different number of linear electrodes may be included in the unit zone. In an exemplary embodiment, at least four linear electrodes may be included in the unit zone. In an exemplary embodiment, as shown in FIG. 2, the lower linear electrode includes a third linear electrode 593 and a fourth linear electrode 594, and the upper linear electrode includes a first linear electrode 591 and a second linear electrode 592.

In an exemplary embodiment, as shown in FIG. 2, in a unit zone, the lower linear electrodes and the upper linear electrodes are alternately positioned, and the lower linear electrodes or the upper linear electrodes include at least two linear electrodes. In such an embodiment, as shown in FIG. 2, one of the linear electrodes, e.g., the second linear electrode 592, is spaced apart from the linear electrodes adjacent thereto at predetermined intervals, e.g., a first interval w1 and a second interval w2, respectively, when viewed from a top plan view, and another of the linear electrodes, e.g., the third linear electrode 593, overlaps or contacts the linear electrodes adjacent thereto when viewed from a top plan view.

In an exemplary embodiment, when the 2D image is displayed, the liquid crystal lens part 500 is not applied with a voltage such that the electric field is not generated therein. In such an embodiment, when the 3D stereoscopic image is displayed, liquid crystal lenses are formed in the liquid crystal lens part 500 that provide phase differences repeatedly changing from a maximum value to a minimum value or from the minimum value to the maximum value. In an exemplary embodiment, the unit zone is defined based on a region occupied by the linear electrodes 590 that collectively change the phase difference from the maximum value to the minimum value or from the minimum value to the maximum value by the voltage applied thereto. In an alternative exemplary embodiment, the zone may be defined by a boundary where a trend of the increasing or the decreasing of the applied voltages is changed. In FIG. 2, the unit zone is defined by the linear electrodes.

In an exemplary embodiment, a unit zone includes a plurality of inner zones corresponding to the linear electrodes 590, respectively, as shown by a dotted line in FIG. 2.

When the 3D image is displayed, the linear electrodes 590 included in a unit zone receive voltages that is gradually increased or decreased in a direction. Among the linear electrodes 590 included in a unit zone, a linear electrode that receives the maximum voltage is referred to as a maximum phase formation electrode, and a linear electrode that receives the minimum voltage is referred to as a minimum phase formation electrode.

In an exemplary embodiment, as described above, the linear electrodes 590 have the first interval w1 and the second interval w2.

In an exemplary embodiment, the first interval w1 is a horizontal distance from the boundary of a unit zone close to the maximum phase formation electrode in the unit zone to the maximum phase formation electrode. In an exemplary embodiment, the second linear electrode 592 may be the maximum phase formation electrode, and the first interval w1 may be the distance between the boundary of the unit zone close to the second linear electrode 592 and the second linear electrode 592, as shown in FIG. 2.

In such an embodiment, the second interval w2 is the horizontal distance between the minimum phase formation electrode in a unit zone and a linear electrode adjacent to the minimum phase formation electrode in the same unit zone (also referred to as a second minimum phase formation electrode). In an exemplary embodiment, as shown in FIG. 2, the minimum phase formation electrode may be the fourth linear electrode 594 and the second minimum phase formation electrode may be the first linear electrode 591. In such an embodiment, the second interval w2 is a distance between the fourth linear electrode 594 and the first linear electrode 591.

The first interval w1 and the second interval w2 may be equal to or less than a cell gap of the lens liquid crystal layer 530. A width of a linear electrode, e.g., the third linear electrode 593, that does not have the first interval w1 or the second interval w2 with adjacent linear electrodes is substantially equal to the width of the inner zone corresponding thereto. Since the adjacent inner zones contact each other, a linear electrode 590, e.g., the third linear electrode 593, that does not have the first interval w1 or the second interval w2 with adjacent linear electrodes contacts the adjacent linear electrodes when viewed from a top plan view such that the horizontal distance between the linear electrodes 590 adjacent to each other is about zero (0). In such an embodiment, a portion of the inner zone, in which the first interval w1 or the second interval w2 are defined, is occupied by a linear electrode, e.g., the second or fourth linear electrodes 592 or 294, and the remaining portion of the inner zone corresponds to the first or second interval w1 or w2.

In an exemplary embodiment, at least one of the first interval w1 and the second interval w2 is defined in a unit zone regardless of the number of linear electrodes 590 in the unit zone.

The upper substrate 520 of the liquid crystal lens part 500 includes a second insulation substrate 521, a plate electrode 570 disposed on the second insulation substrate 521, and an upper alignment layer 523 disposed on the plate electrode 570.

The plate electrode 570 generates an electric field along with the linear electrodes 590, and the plate electrode 570 receives a reference voltage or a common voltage having a predetermined voltage level. The plate electrode 570 may be disposed over substantially an entire region of the second insulation substrate 521.

The lens liquid crystal layer 530 is disposed between the upper substrate 520 and the lower substrate 510, and the lens liquid crystal layer 530 includes a plurality of lens liquid crystal molecules 531.

The lens liquid crystal molecules 531 are initially arranged by the upper alignment layer 523 and the lower alignment layer 513, and then an arrangement direction of the lens liquid crystal molecules 531 is changed by the electric field generated between the plate electrode 570 and the linear electrode 590. When the electric field is generated in each unit zone, a difference in refractive index is provided by the structure of the lens liquid crystal molecules 531 in the unit zone, and the light passing through the lens liquid crystal layer 530 is thereby refracted. When the light from the display panel is refracted by the lens liquid crystal layer 530, different image information is provided to two eyes of a viewer such that the binocular disparity occurs, and the viewer thereby recognizes a stereoscopic effect. In such an embodiment, each unit zone may be referred to as a liquid crystal lens.

In an exemplary embodiment, the liquid crystal lens or the unit zone extends in an oblique arrangement direction with respect to an arrangement direction of the pixels, which may be arranged substantially in a matrix form in the display panel.

Figure 3:
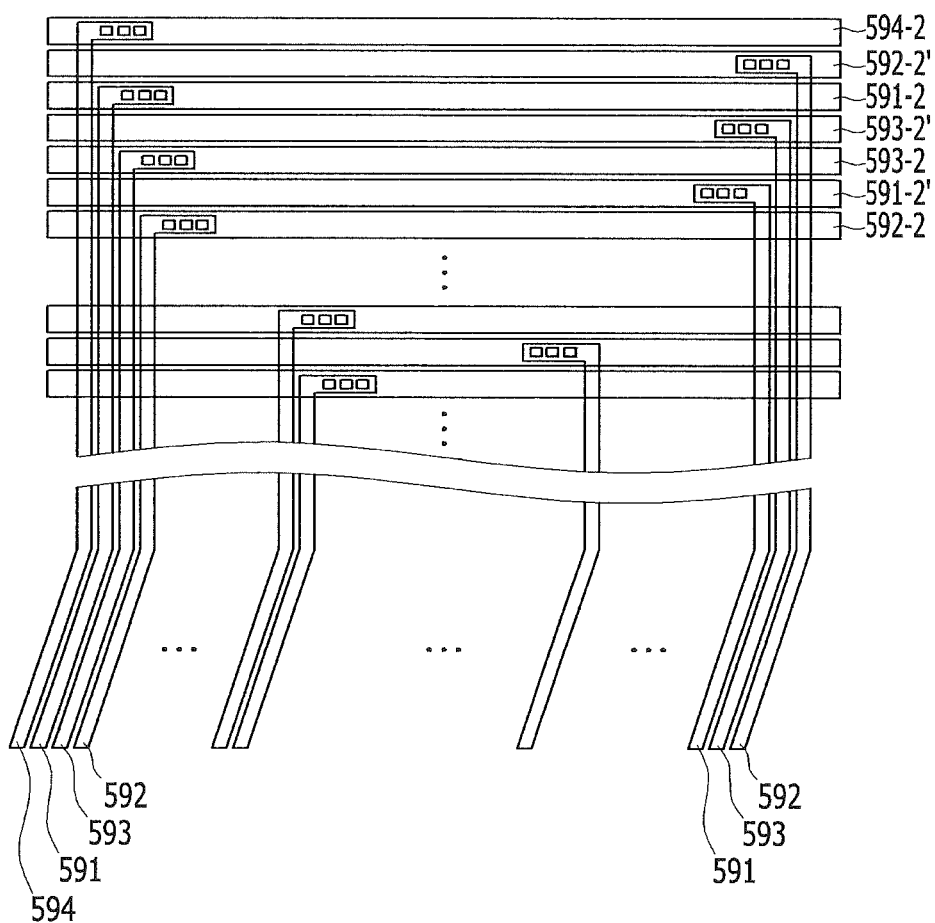
FIG. 3 is a plan view of an exemplary embodiment of an electrode of a liquid crystal lens part and an external voltage application unit according to the invention.

In such an embodiment, where the liquid crystal lens or the unit zone extends in the oblique arrangement direction with respect to an arrangement direction of the pixels, the linear electrodes 591, 592, 593 and 594 extend along a curved line corresponding to the oblique arrangement direction of the liquid crystal lens or the unit zone as shown in FIG. 3. In such an embodiment, the moiré is effectively prevented from be recognized by the viewer.

In an exemplary embodiment, the lens liquid crystal molecules 531 may be initially aligned in the oblique direction by the lower alignment layer 513 to provide the oblique zone or liquid crystal lens. The oblique direction of the lower alignment layer 513 may be substantially the same as the extending direction of the linear electrodes 590. In an exemplary embodiment, the upper alignment layer 523 may initially align the lens liquid crystal molecules 531 in a vertical direction. The initial arrangement structure of the lens liquid crystal molecules 531 in an exemplary embodiment is shown at a left side of FIG. 9.

In such an embodiment, when a lens having curved surfaces is defined by two adjacent unit zones, the curved surfaces may not be substantially symmetrical with respect to the center of the lens due to the oblique extending direction of the unit zones, which will be described in greater detail with reference to FIG. 9 to FIG. 12.

FIG. 3 shows an arrangement of the linear electrodes 590 of the liquid crystal lens part 500 in display and non-display areas.

FIG. 3 is a view of an exemplary embodiment of an electrode of a liquid crystal lens and an external voltage application unit according to the invention.

The linear electrodes 591, 592, 593 and 594 extend in the oblique direction corresponding to the oblique direction of the unit zone or the liquid crystal lens. The portion where the linear electrodes 591, 592, 593 and 594 extend in the oblique direction corresponds to a display area of the display panel.

In a non-display area of the display panel, which is surrounding at least a portion of the display area, the linear electrodes 591, 592, 593 and 594 may extend in the vertical direction and be connected to voltage application wires 591-2, 591-2', 592-2, 592-2', 593-2, 593-2' and 594-2 through contact holes.

The voltage application wires 591-2, 591-2', 592-2, 592-2', 593-2, 593-2', 594-2 are connected to the linear electrodes 591, 592, 593 and 594, respectively, such that the linear electrodes 590 may receive different voltages, thereby forming various liquid crystal lenses.

Next, a characteristic of the liquid crystal lens in the liquid crystal lens part 500 will be described with reference to FIG. 4 to FIG. 8 and FIG. 21 to FIG. 25.

FIG. 4 to FIG. 8 are views showing a characteristic of a liquid crystal lens formed in an exemplary embodiment of the liquid crystal lens part according to the invention, and FIG. 21 to FIG. 25 are views of a characteristic of a liquid crystal lens formed in a comparative example of a liquid crystal lens.

Firstly, an arrangement of lens liquid crystal molecules in an exemplary embodiment of the liquid crystal lens part will be described.

Figure 4:
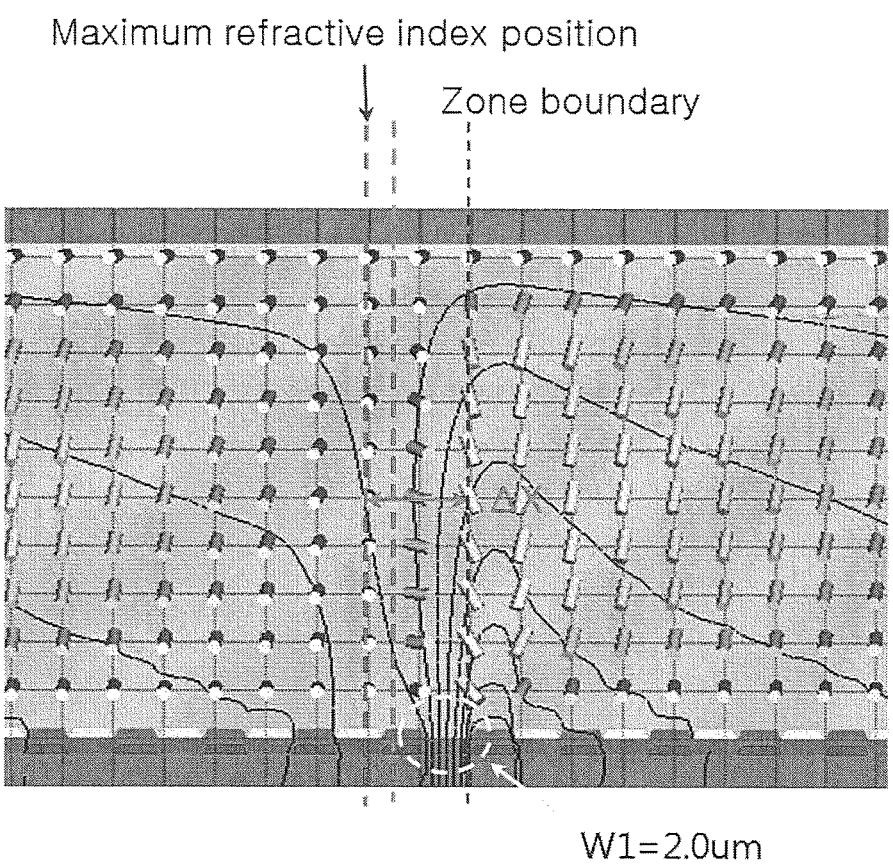
FIG. 4 to FIG. 8 are views showing characteristics of a liquid crystal lens formed in an exemplary embodiment of a liquid crystal lens part according to an exemplary embodiment of the invention.

FIG. 4 shows an arrangement of lens liquid crystal molecules and an equipotential line when an electric field is generated in the liquid crystal lens part 500.

In the liquid crystal lens part shown in FIG. 4, a width of one linear electrode is about 2 micrometers (μm), and an interval between the adjacent linear electrodes positioned in a same layer is about 4 μm.

In FIG. 4, a boundary of the zone and a position of a maximum refractive index are shown. In FIG. 4, a dotted line between lines indicating the boundary of the zone and the position of the maximum refractive index is a line indicating a maximum refractive index position in a comparative example of FIG. 22.

The comparative example includes a linear electrode without the first interval and the second interval such that the linear electrode does not have the horizontal distance. In such comparative example, referring to FIG. 21, the linear electrodes 590' (591', 592', 593', 594') are disposed in two layers, and the linear electrodes 590' (591', 592', 593', 594') contact each other without the interval when viewed from a top plan view.

Figure 22:
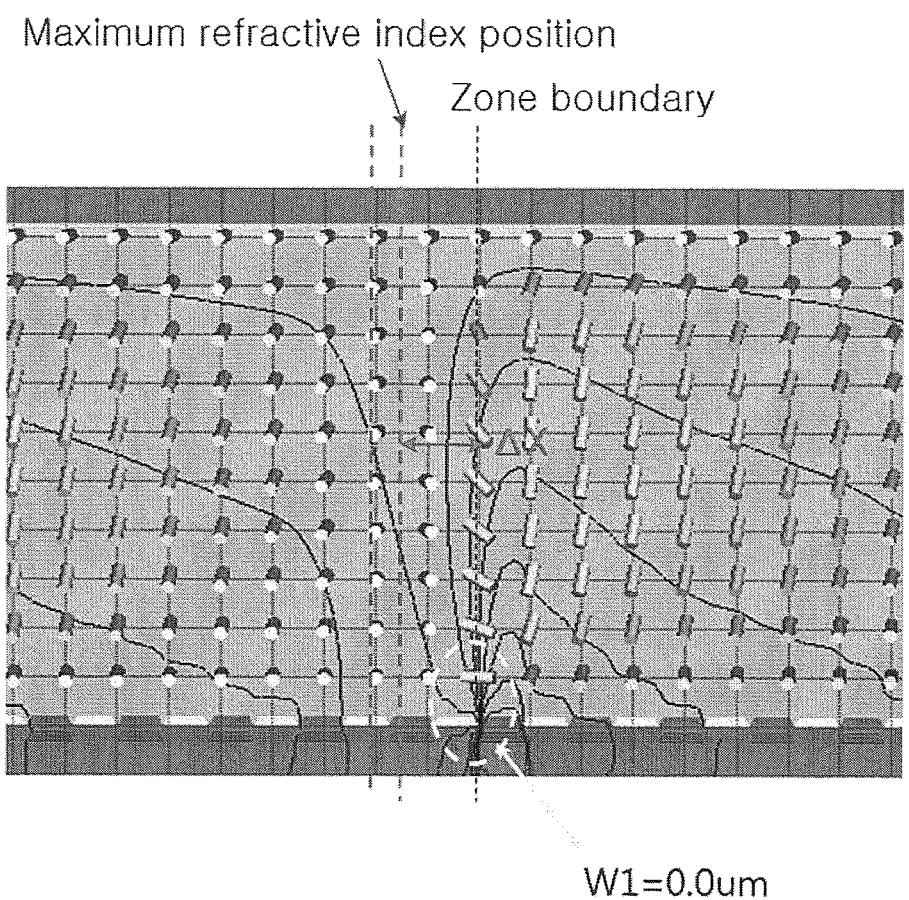

As shown in FIG. 4 and FIG. 22, a distance between the boundary of the unit zone and the position of the maximum refractive index is increased by the first interval w1. Also, as shown in the equipotential line shown in a circle of FIG. 4, while the electric field is spatially distributed, the boundary of the zone and the position of the maximum refractive index are substantially distant from each other.

A region from the position of the maximum refractive index to the boundary of the unit zone is referred to as 'a phase modulation region', And that the phase modulation region allows the refractive index to sequentially change from the position of the minimum refractive index to the position of the maximum refractive index in a unit zone, and a different refractive index characteristic for a different position is generated from the position of the maximum refractive index to the boundary with a next unit zone. The phase modulation region is generated while the liquid crystal is rotated in a plane (in-plane rotation), and a characteristic of a quarter wave plate/half wave plate/quarter wave plate ("QHQ") region shown in FIG. 18 to FIG. 20 may be provided.

Figure 5:
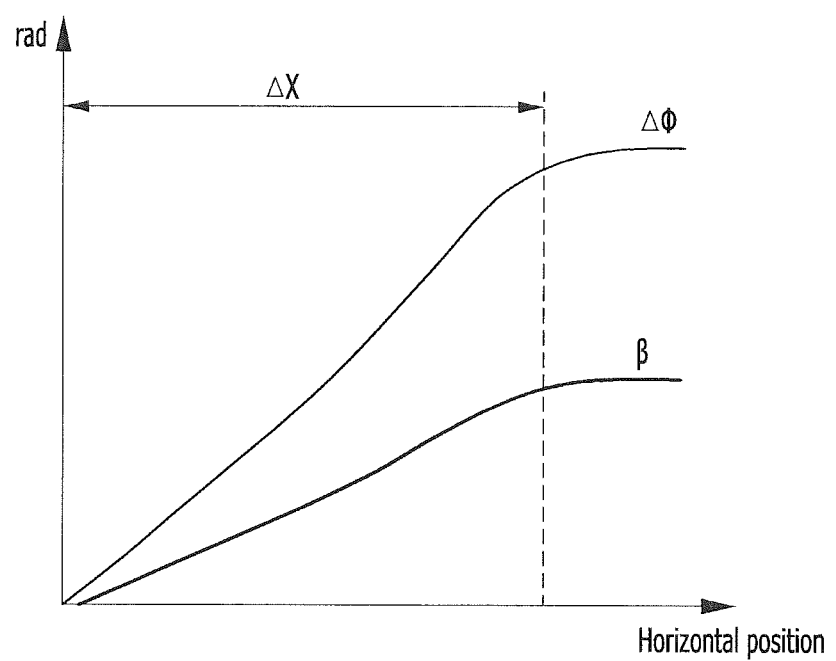
Figure 6:
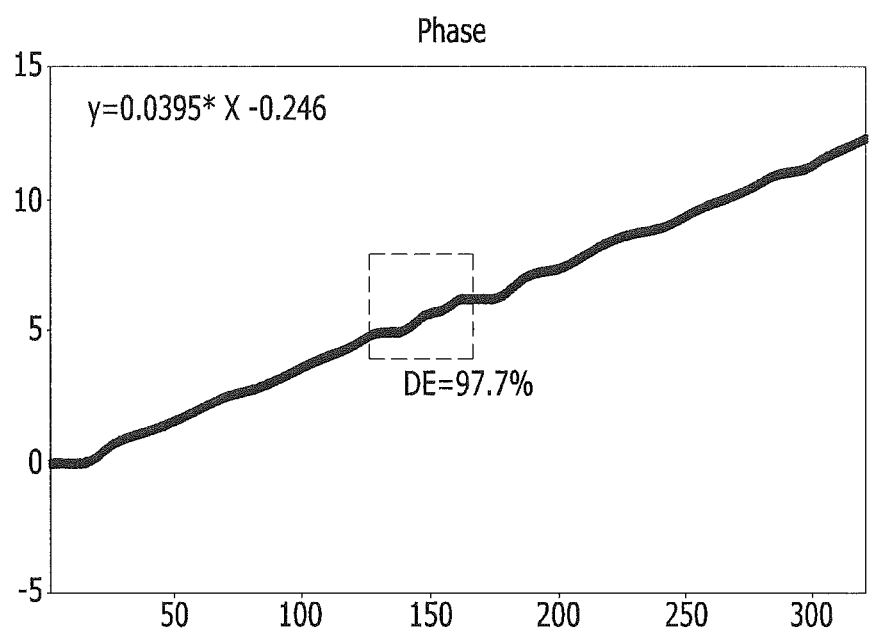

Characteristics provided by the first interval w1 are shown in FIG. 5 and FIG. 6.

FIG. 5 is a graph showing a phase modulation amount ($\Phi$) and a liquid crystal director azimuthal angle ($\beta$) in the phase modulation region, and FIG. 6 is a linear graph showing a phase change for a horizontal position.

Figure 23:
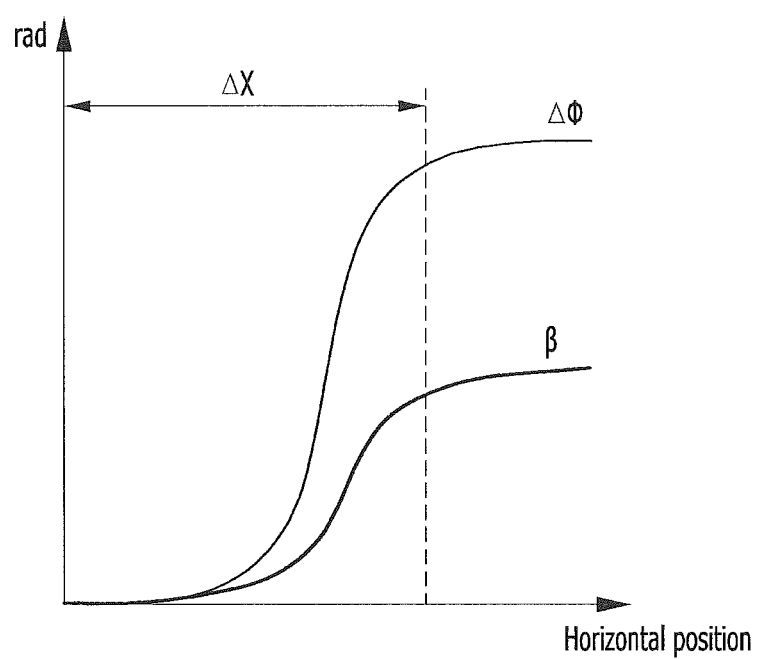
Figure 24:
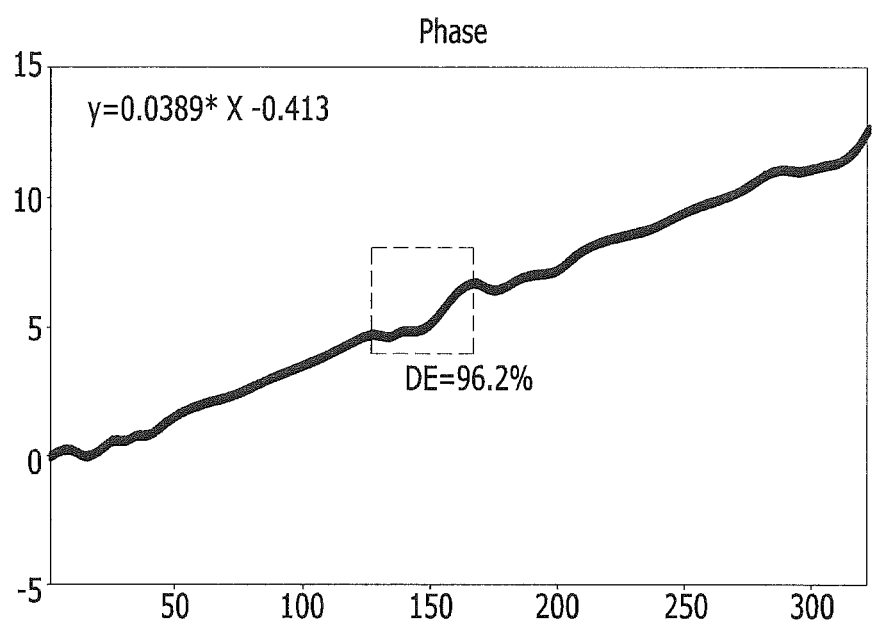

On the other hand, FIG. 23 and FIG. 24 show a phase modulation amount ($\Phi$) and a liquid crystal director azimuthal angle ($\beta$) in the phase modulation region and a phase change in the comparative example.

As shown in FIG. 5 and FIG. 23, in the comparative example, the phase modulation amount ($\Phi$) and the liquid crystal director azimuthal angle ($\beta$) are non-linearly changed in the phase modulation region, while the phase modulation amount ($\Phi$) and the liquid crystal director azimuthal angle ($\beta$) are substantially linearly changed in the phase modulation region in an exemplary embodiment of the invention.

FIG. 6 and FIG. 24 show a phase change in the entire unit zone due to a characteristic difference in the phase modulation region. FIG. 6 and FIG. 24 show a linear equation representing the corresponding characteristic by a line.

In FIG. 24, a portion where the phase change has a large curve exists at the center. In an exemplary embodiment, as shown in FIG. 6, the phase change is generated without the large curve. As shown in FIG. 6 and FIG. 24, the diffraction efficiency DE in the comparative example is generated at about 96.2%, while the diffraction efficiency DE in an exemplary embodiment of the invention is generated at about 97.7%. As the diffraction efficiency DE is high, the liquid crystal lens part 500 diffracts the light substantially in a predetermined direction, thereby effectively functioning as a lens.

Next, the characteristic provided by the second interval w2 will be described with reference to FIG. 7 and FIG. 8.

Figure 7:
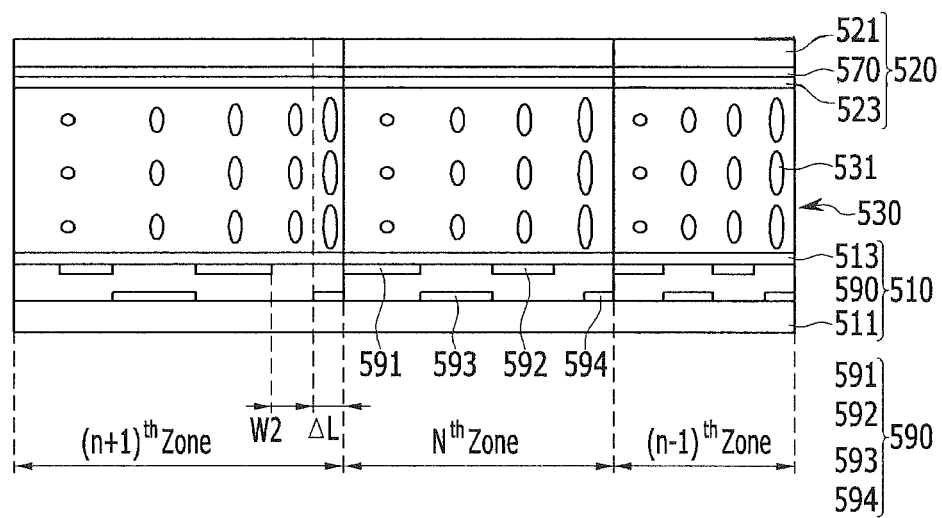
Figure 8:
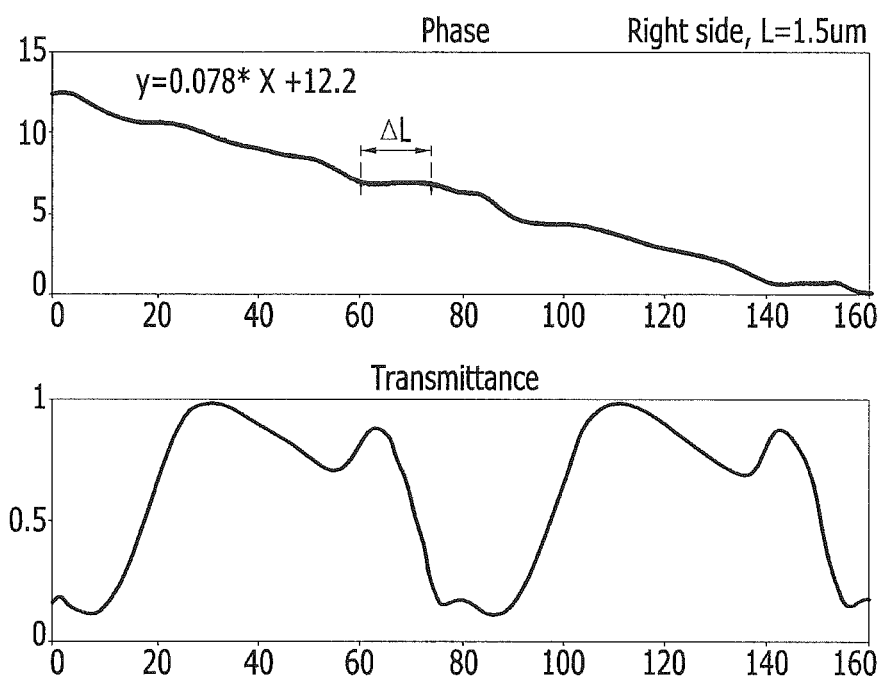

As shown in FIG. 7 and FIG. 8, the width of the minimum phase formation electrode 594 is substantially reduced by the second interval w2. When the width of the minimum phase formation electrode 594 is large, the width of the region where the constant phase difference is provided is increased as the width of the region where the minimum phase is provided becomes substantially great and substantially constant, as shown in FIG. 8 and FIG. 25.

Figure 25:
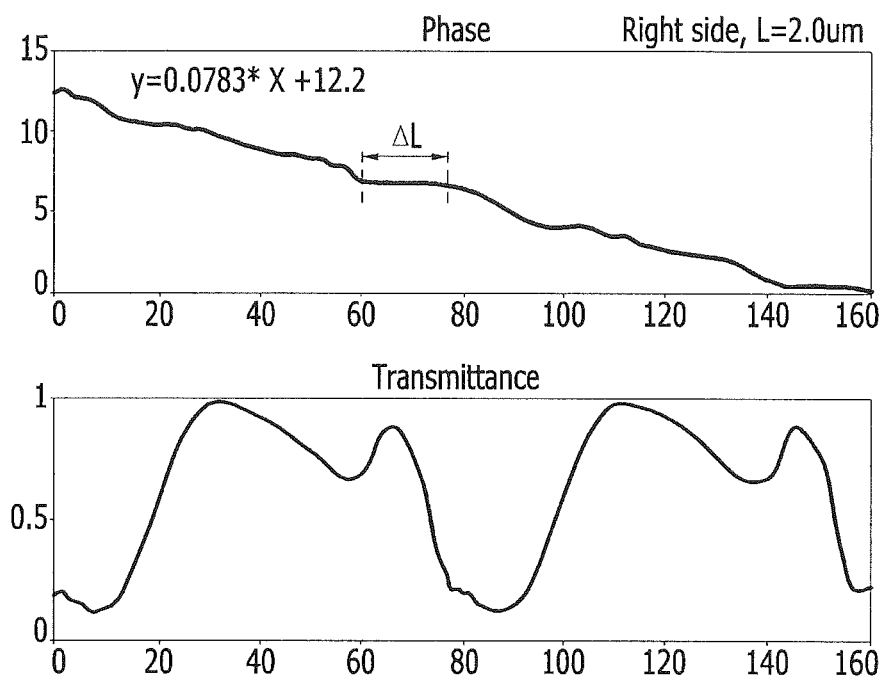

FIG. 8 and FIG. 25 show a linear equation representing the corresponding characteristic by a line.

FIG. 8 is a graph showing a phase difference versus the horizontal and transmittance versus the horizontal distance in an exemplary embodiment of the liquid crystal lens part, and FIG. 25 is a graph a graph showing a phase difference versus the horizontal distance and transmittance versus the horizontal distance in a comparative example of the liquid crystal lens part, where the second interval w2 is not provided. In FIG. 8 and FIG. 25, the graphs showing phase difference versus the horizontal distance is provided in the upper side, and the graphs showing the transmittance versus the horizontal distance is provided in the lower side.

Referring to the upper graph of FIG. 8 and FIG. 25, the horizontal distance (ΔL), where the phase difference provided by the width of the minimum phase formation electrode 594 is substantially constant, is relatively wide in the comparative example.

In an exemplary embodiment, the phase difference having the constant horizontal distance (ΔL) is substantially narrow such that a liquid crystal lens provided by the liquid crystal lens part effectively operates as a lens.

An exemplary embodiment of a method of determining the first interval w1 and the second interval w2 will be described with reference to FIG. 9 to FIG. 13D.

Firstly, an exemplary embodiment of a method of determining the first interval w1 will be described with reference to FIG. 9 to FIG. 12.

FIG. 9 to FIG. 12 are views showing characteristics of a liquid crystal lens formed in an exemplary embodiment of a liquid crystal lens part based on a first interval according to the invention.

Figure 9:
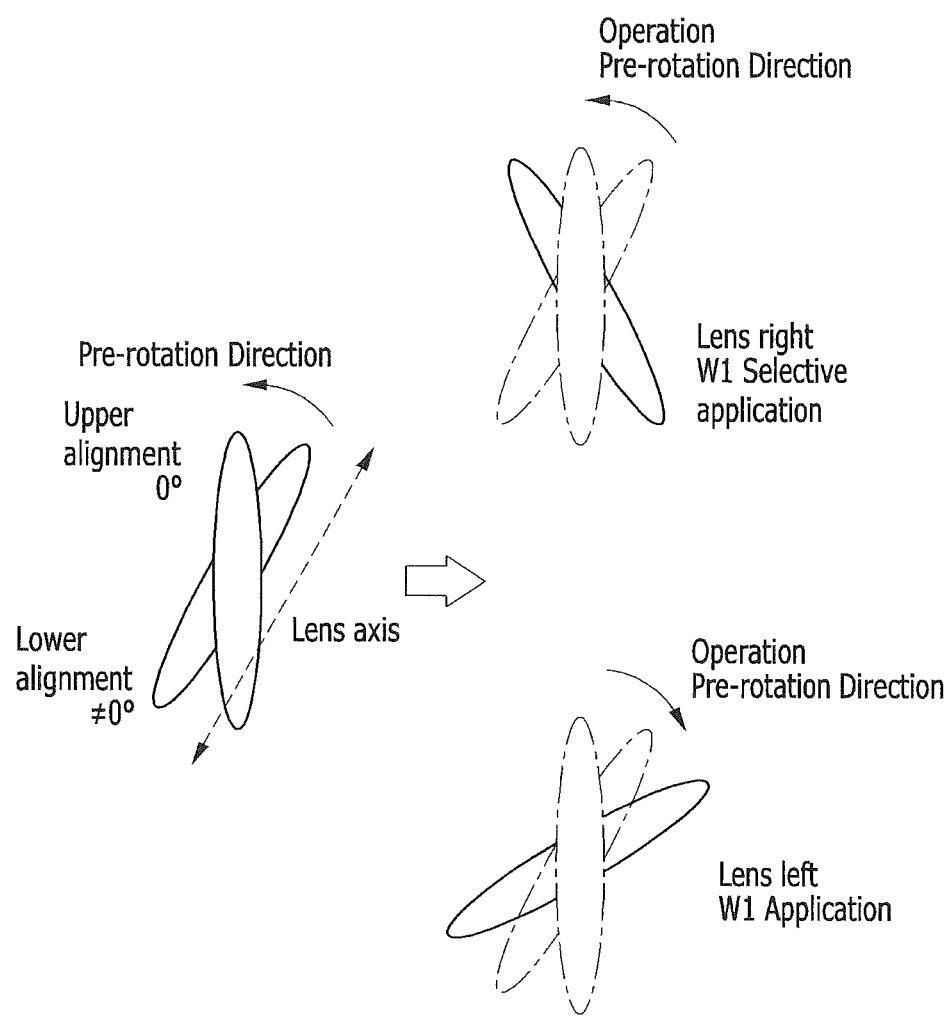
FIG. 9 to FIG. 12 are views showing characteristics of a liquid crystal lens formed in an exemplary embodiment of a liquid crystal lens part based on a first interval according to the invention.

In an exemplary embodiment, a lower alignment direction and an upper alignment direction of the lens liquid crystal molecule have different initial alignment structures as shown in a left side of FIG. 9. Hereinafter, an angle between the lower alignment direction and the upper alignment direction of the lens liquid crystal molecules shown in the left side of FIG. 9 will be referred to as a lens inclination. In such an embodiment, the alignment directions of the lens liquid crystal molecules in the lens liquid crystal layer provided by the lower polarizer and by the upper polarizer are not substantially parallel to each other. The value of the lens inclination is greater than about 10 degrees, but not being limited thereto. In an alternative exemplary embodiment, the value of the lens inclination is may be less than about 10 degrees. Characteristics of the lens liquid crystal layer based on the lens inclination will be described in detail with reference to FIG. 10 and FIG. 11.

As shown in the right side of FIG. 9, the lens liquid crystal molecules in a right lens and the lens liquid crystal molecules in a left lens are differently operated by the electric field, e.g., rotate different directions from the initial alignment state of the lens liquid crystal molecules.

The liquid crystal molecule shown at the right upper portion of FIG. 9 is the lens liquid crystal molecule that rotates in the right portion of the liquid crystal lens (the right lens) and rotates as shown by a solid line, e.g., rotates in a counter-clockwise direction. In the right lens region, the value of the first interval w1 may be about zero (0).

The liquid crystal molecule shown at the right lower portion of FIG. 9 is the lens liquid crystal molecule that rotates in the left portion of the liquid crystal lens (the left lens) and rotates as shown by a solid line, e.g., rotates in a clockwise direction. In an exemplary embodiment, the first interval is provided in the region of the left lens.

When substantially symmetric voltages are applied, the liquid crystal lenses may not be substantially symmetrically formed in the liquid crystal lens part due to the difference in the initial alignment of the lens liquid crystal molecules therein. In such an embodiment, the linear electrodes may be applied with the different voltages to provide substantially symmetric the liquid crystal lens. In an exemplary embodiment, as shown in FIG. 3, the voltage application wires that apply the different voltages to the linear electrode may be provided.

Next, a lens characteristic difference based on the first interval w1 according to a phase inclination corresponding to the lens inclination will be described with reference to FIG. 10 and FIG. 11. The phase inclination is a phase difference (radian: rad) per horizontal distance (μm) and indicates a degree that the phase difference is changed.

Figure 10:
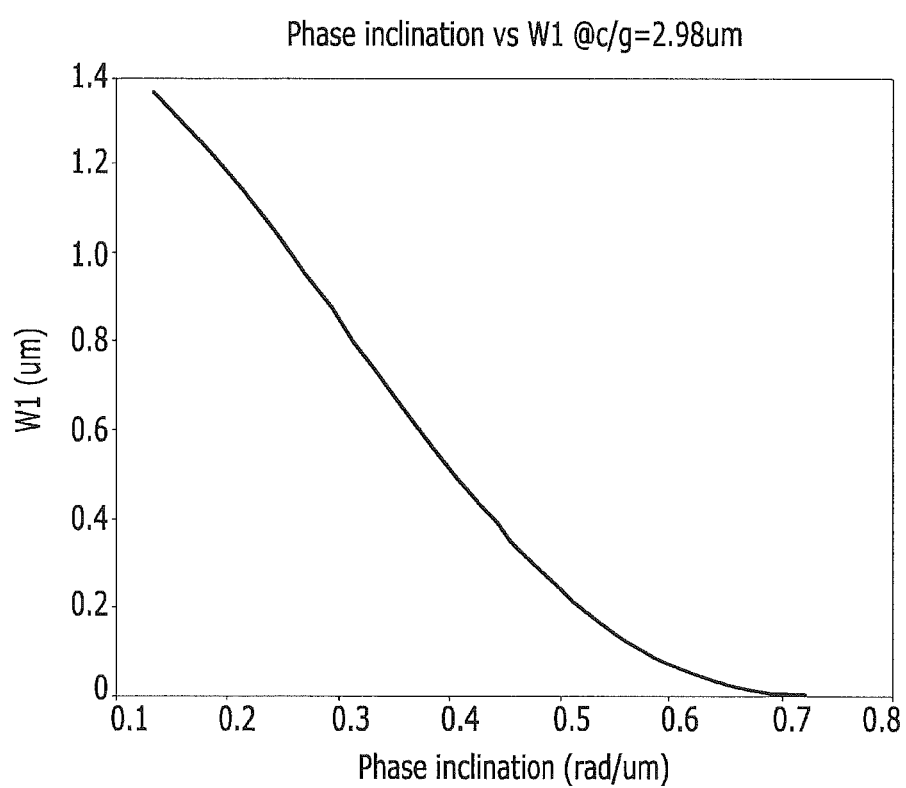
Figure 11:
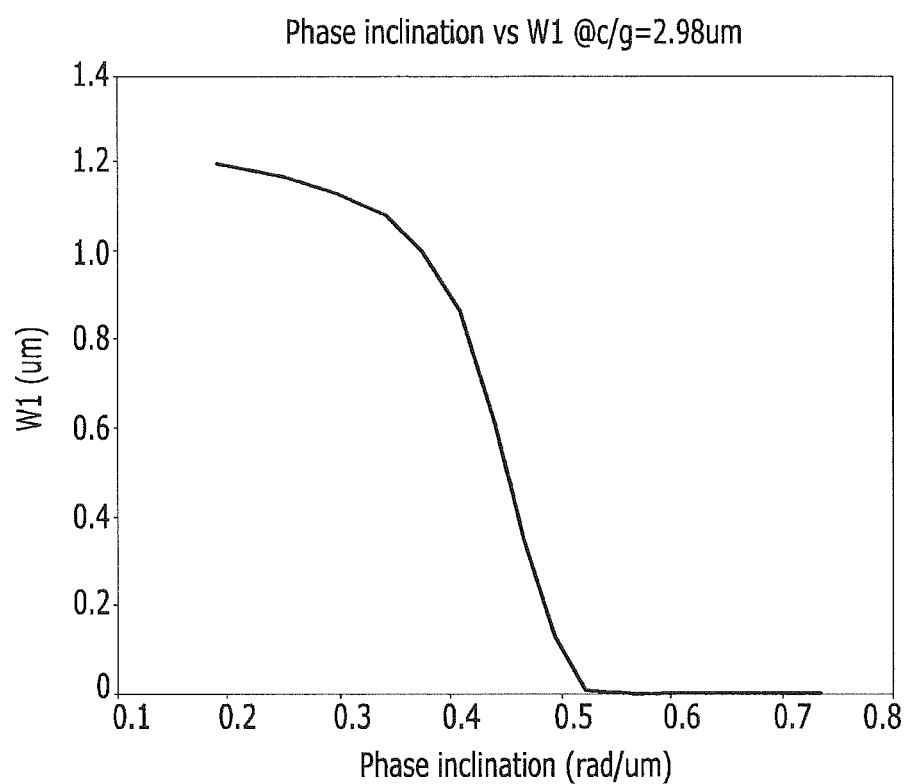

FIG. 10 shows a graph of the first interval w1 versus the phase inclination when the lens inclination is greater than about 10 degrees (e.g., the lens inclination of about 15.25 degrees), and FIG. 11 shows a graph of the first interval w1 versus the phase inclination when the lens inclination is less than about 10 degrees (e.g., the lens inclination of about 8.8 degrees).

When the lens inclination is greater than about 10 degrees, the first interval w1 is gradually decreased as the phase inclination becomes greater. When the lens inclination is less than about 10 degrees, the first interval w1 is rapidly degreased as the phase inclination becomes greater such that a the first interval w1 becomes zero (0) at relatively large the phase inclinations.

The maximum value of the first interval w1 is relatively small in FIG. 11 when the lens inclination is substantially small.

FIG. 10 and FIG. 11 show graphs of the first interval w1 versus the phase inclination in a unit zone corresponding to the left lens.

The relationship between the first interval w1 and the phase inclination in a unit zone corresponding to the right lens is opposite to the relationship between the first interval w1 and the phase inclination in a unit zone corresponding to the left lens. In the right lens, when the lens inclination is small, the first interval w1 is gradually decreased as the phase inclination becomes larger, and the first interval w1 is rapidly decreased as the phase inclination becomes larger when the lens inclination is large such that the first interval w1 becomes zero 0 at small phase inclinations. When the lens inclination is large, the maximum value of the first interval w1 is relatively small.

Figure 12:
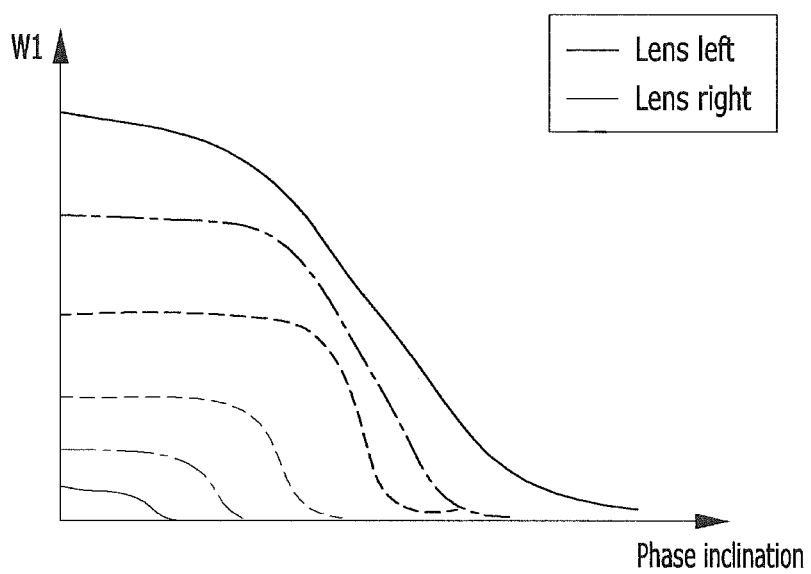

The characteristic of the first interval w1 according to the phase inclination of the right lens and the left lens is shown in FIG. 12.

FIG. 12 is a graph of the first interval w1 versus the phase inclination in the left lens and the right lens having three initial alignment states shown by a solid line, a dash-dot line and a dotted line, respectively. The left lens is indicated by a bold line and the right lens is indicated by a thin line.

The largest lens inclination is indicated by the solid line, the second largest lens inclination is indicated by the dash-dot line, and the smallest lens inclination is indicated by the dotted line.

Referring to FIG. 12, when the lens inclination is large, the difference of the right lens and the left lens is substantially great such that the liquid crystal lens has a strong asymmetry characteristic. When the lens inclination is decreased, the difference of the right lens and the left lens is decreased. When the lens inclination is about zero (0), the right lens and the left lens have substantially the same relationship between the first interval w1 and the phase inclination as the upper and lower liquid crystals have substantially the same initial alignment.

In an exemplary embodiment, when providing the lens inclination with respect to an axis of the liquid crystal lens, the first interval w1 may be predetermined based on the characteristics of the phase inclination according to the first interval W2 show in FIG. 12. In such an embodiment, the right lens and the left lens may have different first intervals w1 to provide the liquid crystal inclination.

Hereinafter, relationship between the cell gap ("C/G") of the lens liquid crystal layer 530 increases and the first interval w1 will be described with reference to FIGS. 13A to 13D.

FIGS. 13A to 13D are views showing a characteristic of an exemplary embodiment of a liquid crystal lens according to a cell gap of the liquid crystal lens.

Figure 13A:
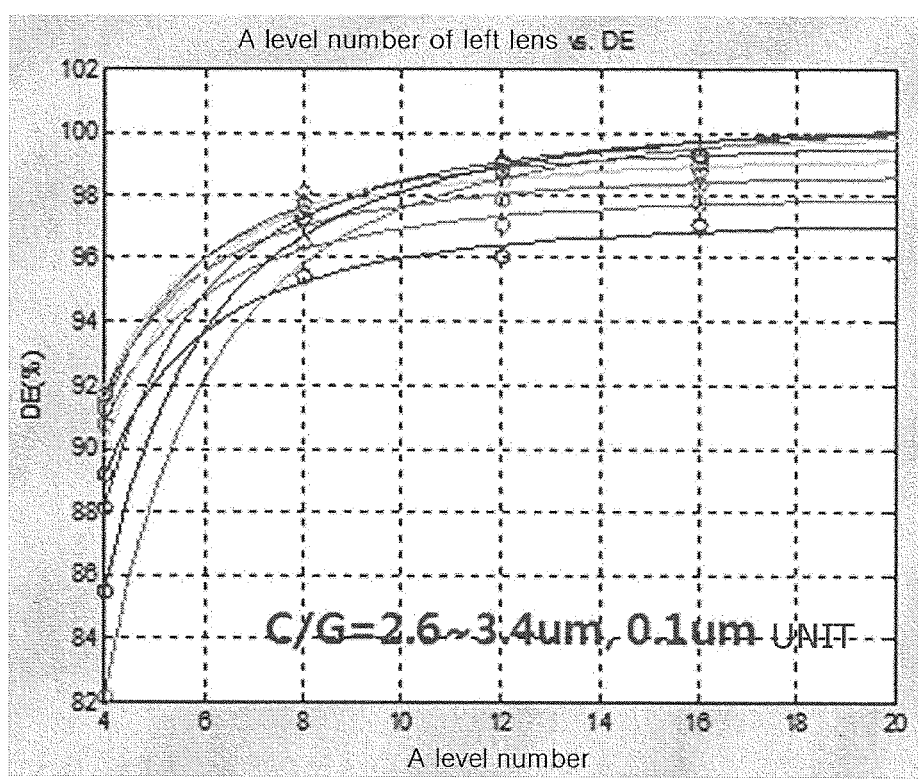
FIGS. 13A to 13D are views showing a characteristic of an exemplary embodiment of a liquid crystal lens according to a cell gap of the liquid crystal lens.
Figure 13B:
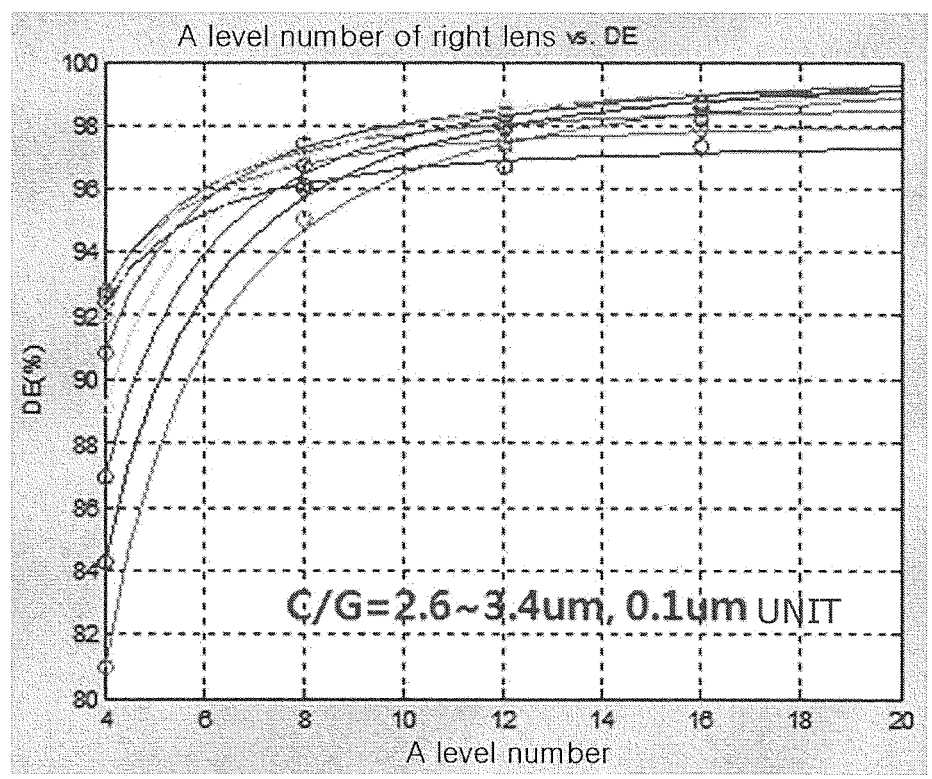

FIG. 13A shows a graph of a diffraction efficiency DE versus a number (a level number) of the linear electrode included in a unit zone corresponding to the left lens when the cell gap is in a range from about 2.6 µm to 3.4 µm with a unit of 0.1 µm, e.g., the cell gap is about 2.6 µm, about 2.7 µm, about 2.8 µm, about 2.9 µm, about 3.0 µm, about 3.1 µm, about 3.2 µm, about 3.3 µm and about 3.4 µm, and FIG. 13B shows a graph of a diffraction efficiency DE versus a number of the level the linear electrode included in a unit zone corresponding to the right lens when the cell gap is about 2.6 µm, about 2.7 µm, about 2.8 µm, about 2.9 µm, about 3.0 µm, about 3.1 µm, about 3.2 µm, about 3.3 µm and about 3.4 µm.

Firstly, in FIG. 13A and FIG. 13B, a case where the cell gap is largest is a case where the diffraction efficiency is lowest when the number of linear electrodes is 4, and a case where the cell gap is lowest is a case where the diffraction efficiency is lowest when the number of linear electrodes is a maximum.

As a number of the level is increased, the phase inclination in the corresponding unit zone becomes lower. When the phase inclination is small, the diffraction efficiency becomes greater as the cell gap becomes larger, and when the phase inclination is large, the diffraction efficiency becomes greater as the cell gap becomes smaller.

Figure 13C:
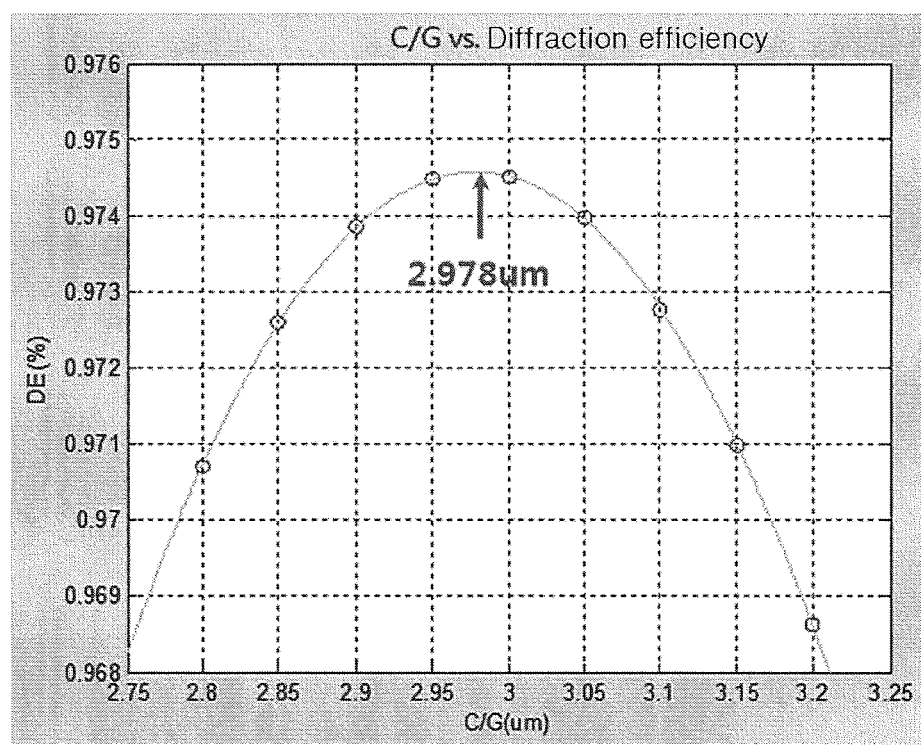

The diffraction efficiency versus the cell gap based on the graphs shown in FIG. 13A and FIG. 13B is shown in FIG. 13C. In FIG. 13C, the maximum diffraction efficiency is generated in a predetermined cell gap, e.g., in a cell gap of about 2.978 µm.

In an exemplary embodiment, as shown in FIG. 13C, the liquid crystal lens part 500 may be provided to have the maximum diffraction efficiency by providing the cell gap to have a predetermined value.

Figure 13D:
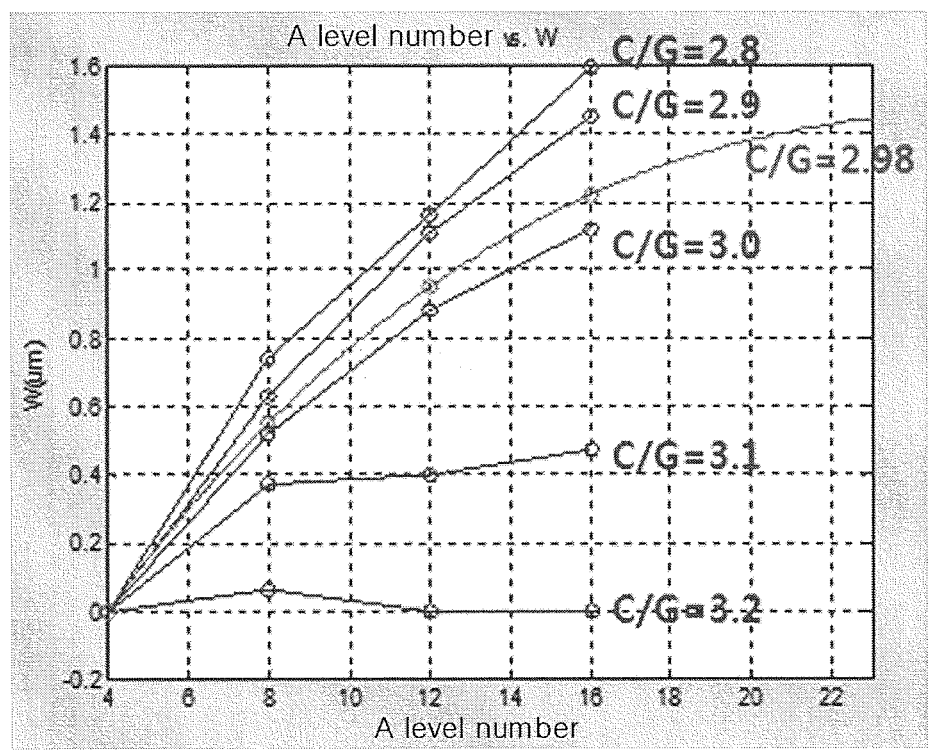

FIG. 13D is a graph of the first interval w1 versus the level number for various cell gaps.

As the level number of FIG. 13D increase, the phase inclination becomes smaller, and the tendency of change shown in FIG. 13D is substantially the same as the tendency of change of the inclination shown in FIG. 10.

Referring to FIG. 13A to FIG. 13D, when the cell gap is constant, the maximum diffraction efficiency for the phase inclination may not be effectively provided at a predetermined level number. Accordingly, in an exemplary embodiment, the cell gap may be provided to have different values in the lens liquid crystal layer, and the maximum diffraction efficiency is thereby effectively obtained.

In an exemplary embodiment, where the cell gap of the lens liquid crystal layer 530 of the liquid crystal lens part 500 is substantially constant, the cell gap may be predetermined for the average of the diffraction efficiency reflecting a weight value that is a product of the transmittance and the area ratio of each unit zone to be maximum. In an exemplary embodiment, where the cell gap is predetermined to have a constant value based on the diffraction efficiency shown in FIG. 13A and FIG. 13B, the value of the cell gap may be selected based on the weight value.

In an alternative exemplary embodiment, the cell gap of the lens liquid crystal layer 530 of the liquid crystal lens part 500 may be provided to have various values. In such an embodiment, the liquid crystal lens part 500 having the maximum diffraction efficiency may be provided in each portion by selecting the cell gap having the maximum diffraction efficiency as shown in FIG. 13A and FIG. 13B. Such an embodiment will be described in detail with reference to FIG. 14 and FIG. 15.

Figure 14:
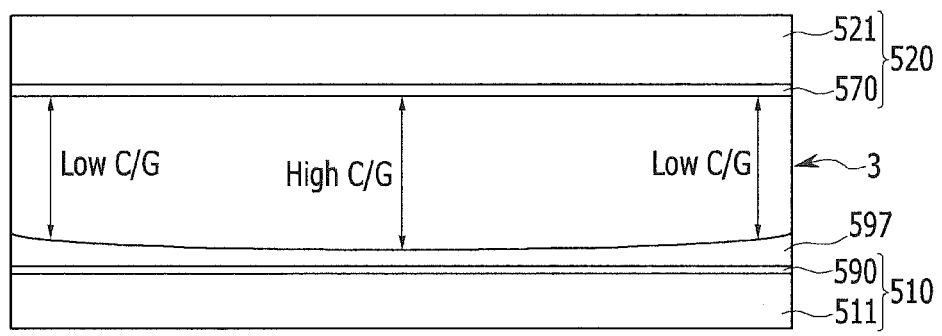
FIG. 14 and FIG. 15 are cross-sectional views of an alternative exemplary embodiment of a liquid crystal lens according to the invention.
Figure 15:
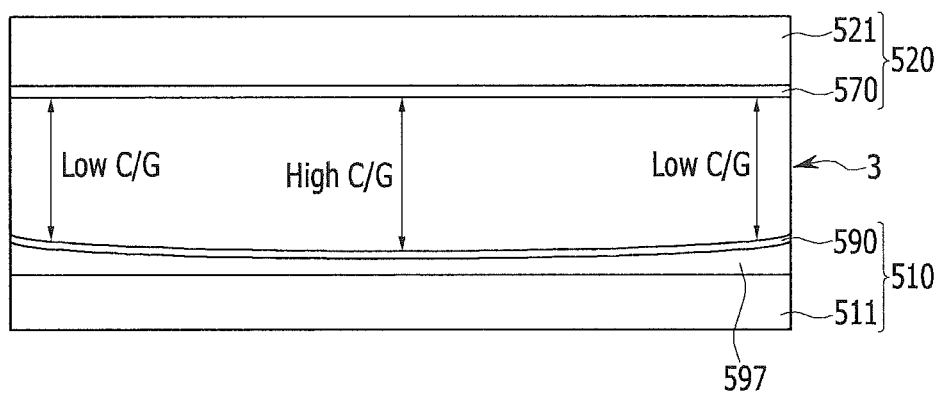

FIG. 14 and FIG. 15 are cross-sectional views of an alternative exemplary embodiment of a liquid crystal lens part according to the invention.

The liquid crystal lens part in FIGS. 14 and 15 is substantially the same as the liquid crystal lens part shown in FIG. 2 except for a cell gap control layer. The same or like elements shown in FIGS. 14 and 15 have been labeled with the same reference characters as used above to describe the exemplary embodiments of the liquid crystal lens part shown in FIG. 2, and any repetitive detailed description thereof will hereinafter be omitted or simplified.

The liquid crystal lens part 500 of FIG. 14 and FIG. 15 further includes the cell gap control layer 597. The cell gap control layer 597 has a different thickness depending on the position, and is a layer that is provided, e.g., formed, by controlling the thickness based on a corresponding cell gap. In such an embodiment, the cell gap is predetermined based on a cell gap value to have the maximum diffraction efficiency as shown in FIG. 13A and FIG. 13B.

In an exemplary embodiment, as shown in FIG. 14, the cell gap control layer 597 is disposed on the linear electrode 590. In an alternative exemplary embodiment, as in FIG. 15, the cell gap control layer 597 may be disposed under the linear electrode 590.

In an exemplary embodiment, the cell gap control layer 597 includes an organic layer including an organic material, and the thickness of the cell gap control layer 597 may be controlled through slit exposure and through pressing using a mold. In an alternative exemplary embodiment, the cell gap control layer 597 may include a transparent insulating layer including an inorganic material, and the thickness of the cell gap control layer 597 may be controlled by etching and depositing.

In an exemplary embodiment, where the lens liquid crystal layer has the cell gap that is not constant due to the cell gap control layer 597, the cell gap value of the lens liquid crystal layer may be determined to have at least two cell gap values such that the diffraction efficiency is maximized.

In FIG. 14 and FIG. 15, a detailed structure of the linear electrode 590 is not shown, but the linear electrode 590 may be patterned to have a phase inclination corresponding to the cell gap.

Hereinafter, a characteristic of the second interval w2 will be described with reference to FIG. 16.

Figure 16:
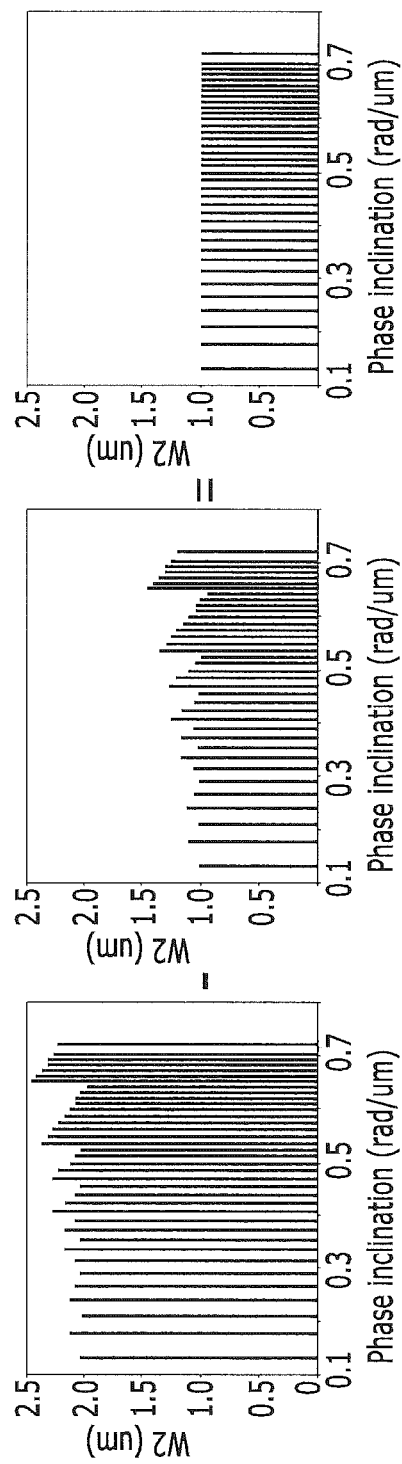
FIG. 16 is a view showing a characteristic of a liquid crystal lens formed in an exemplary embodiment of a liquid crystal lens part based on a second interval according to the invention.

FIG. 16 is a view showing a characteristic of a liquid crystal lens formed in an exemplary embodiment of a liquid crystal lens part based on a second interval according to the invention.

In FIG. 16, the left graph is a case where the second interval w2 is not provided, and the middle graph is a case where the second interval w2 is provided to have a constant value. A difference between the two graphs is shown at the right side, and it shows that the second interval w2 has a constant value.

In an exemplary embodiment, the second interval w2 is determined to have a value that is less than the cell gap, and a minimum phase electrode may be provided to have a minimum width that may be provided by a manufacturing process thereof as the region providing the constant phase difference is reduced when the width of the minimum phase electrode is reduced, as shown in FIG. 8. In an exemplary embodiment, the width of the minimum phase electrode based on the second interval w2 may have a value of about 1 μm.

In an exemplary embodiment, the second interval may be provided in a unit zone corresponding to the right lens. In an alternative exemplary embodiment, the second interval may be selectively provided in a unit zone corresponding to the left lens. In one exemplary embodiment, for example, where the lens inclination is substantially large (e.g., 15.25 degrees), the second interval w2 may be provided only in a unit zone corresponding to the right lens. In one exemplary embodiment, for example, where the lens inclination is substantially small (e.g., 8.8 degrees), the second interval w2 may be provided substantially symmetrically in unit zones corresponding to the right and left lens.

Figure 17:
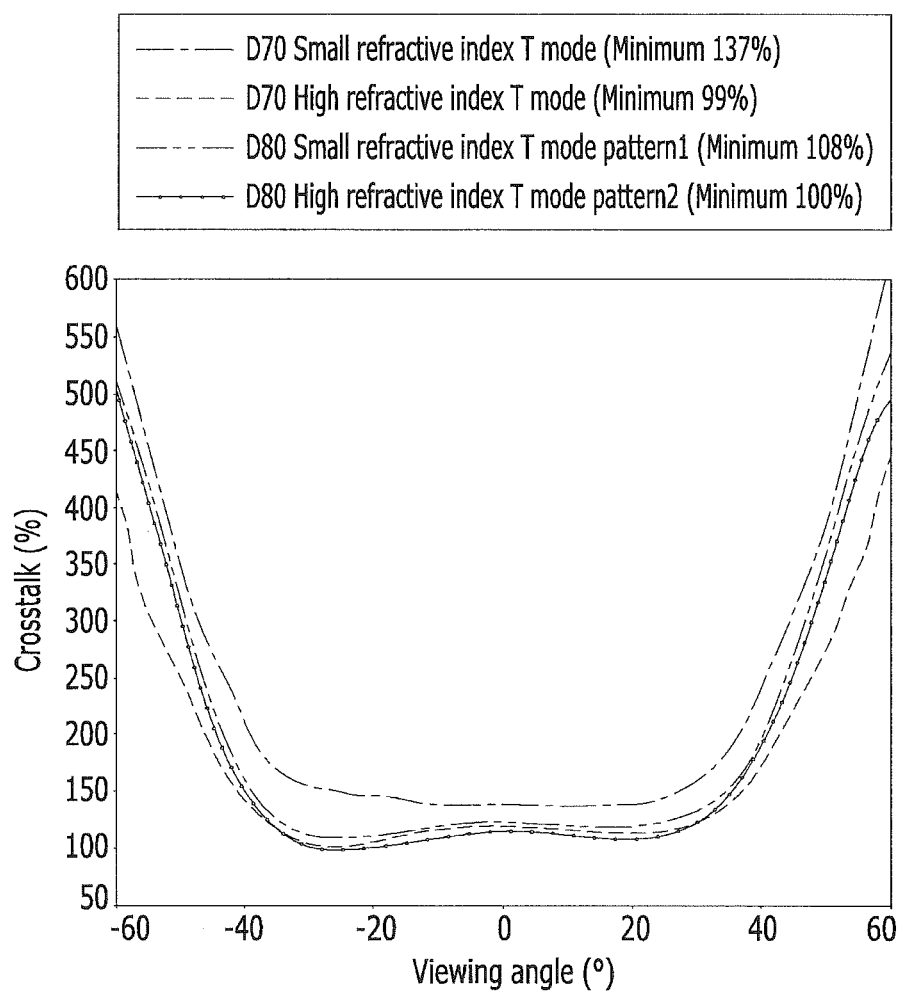
FIG. 17 is a view of a characteristic of a liquid crystal lens of an alternative exemplary embodiment of a liquid crystal lens part according to the invention.

FIG. 17 shows a crosstalk characteristic in an exemplary embodiment of the invention and a comparative example.

FIG. 17 is a view showing a characteristic of an exemplary embodiment of a liquid crystal lens according to the invention.

FIG. 17 is a graph of a crosstalk versus a viewing angle. The crosstalk occurs when the image to be applied to the left eye is applied to the right eye, or vice versa. In FIG. 17, D70 indicates a comparative example in which the first interval w1 and the second interval w2 are not provided, and D80 indicates an exemplary embodiment of the invention in which the first interval w1 and the second interval w2 are provided.

As shown in FIG. 17, an exemplary embodiment of the invention has substantially less crosstalk in the predetermined viewing angle range such that the quality of the stereoscopic image is substantially improved.

Figure 18:
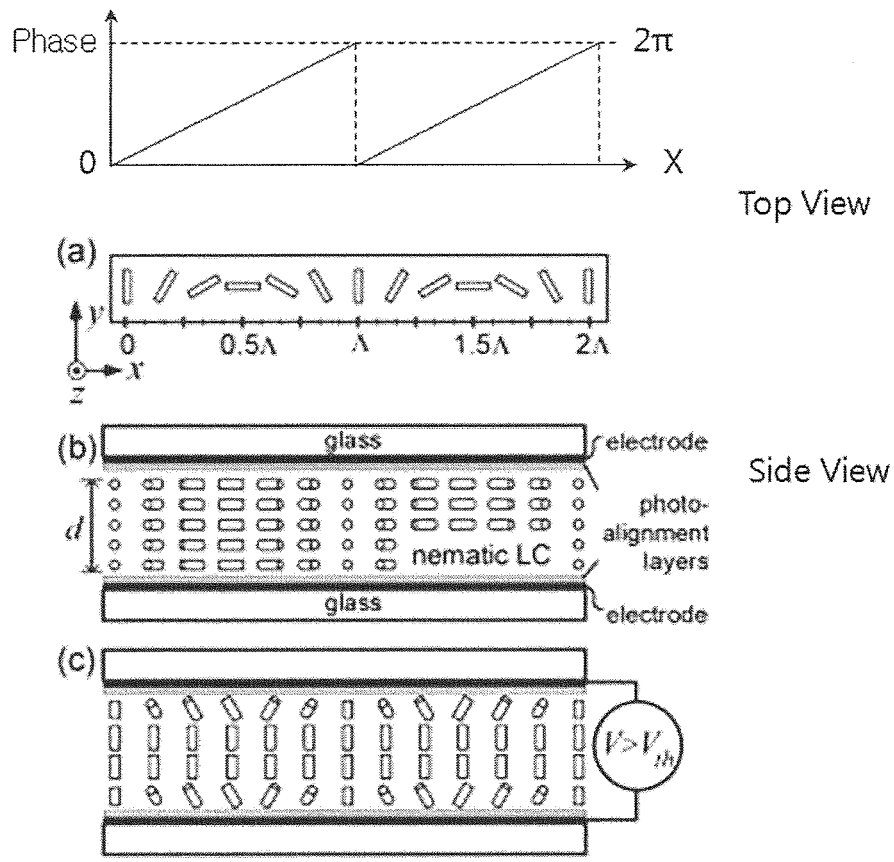
FIG. 18 to FIG. 20 are views of a characteristic of a phase modulation region in an exemplary embodiment of a liquid crystal lens part according to the invention.
Figure 19:
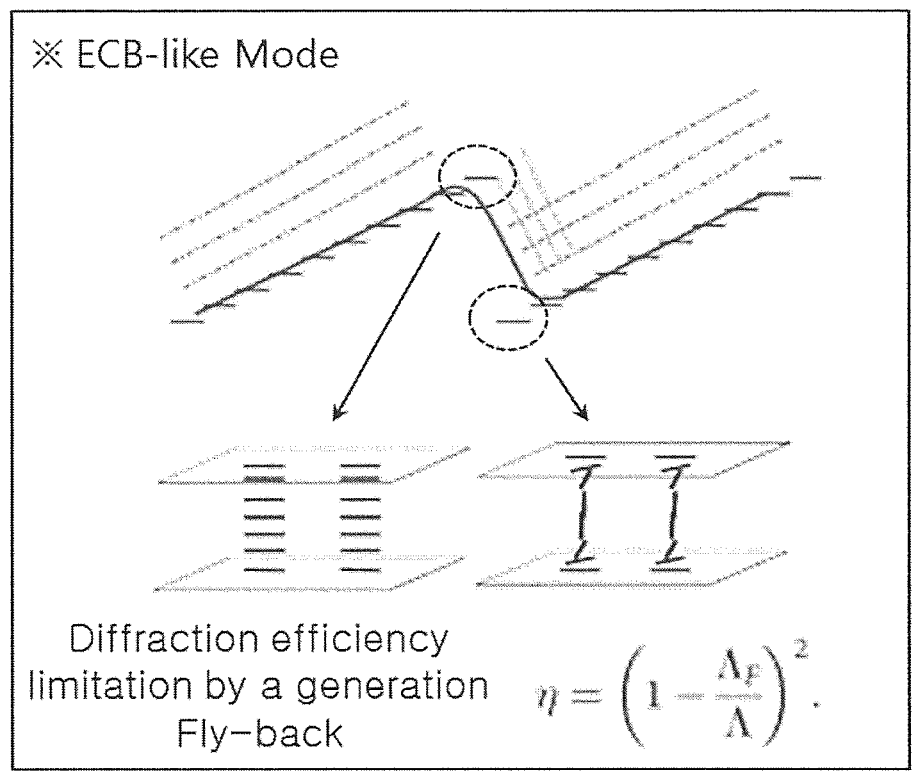
Figure 20:
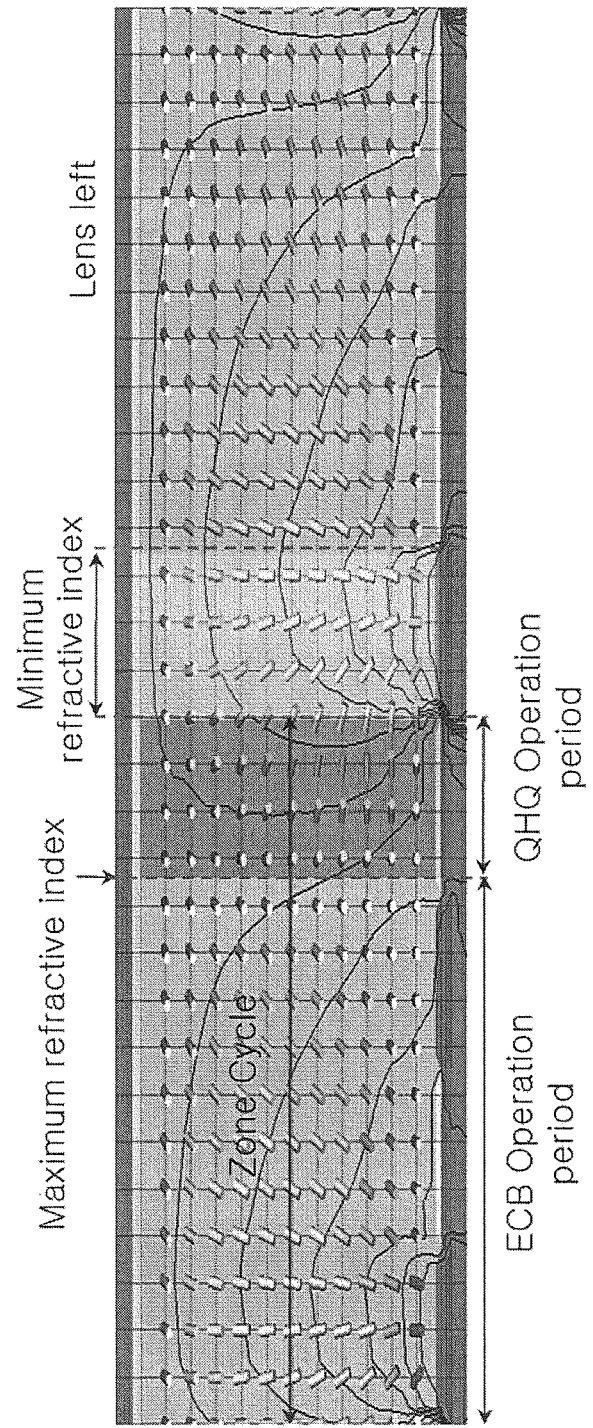
Figure 21:
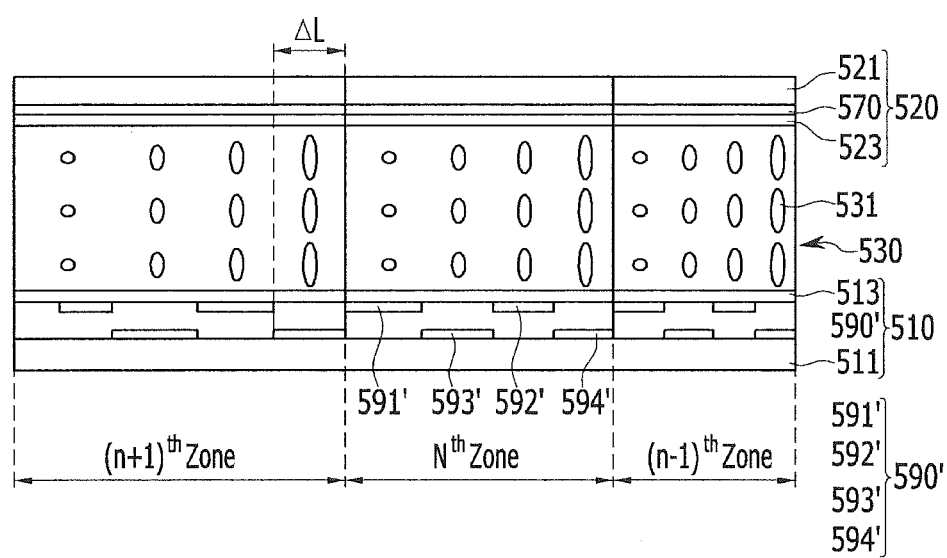
FIG. 21 to FIG. 25 are views of a characteristic of a liquid crystal lens formed in a comparative example of a liquid crystal lens.

Next, FIG. 18 to FIG. 20 show a characteristic of a phase modulation region, where FIG. 18 and FIG. 19 are a content of "A review of phased array steering for narrow-band electro-optical systems, Paul F. McManamon, IEEE 2009", and FIG. 20 shows a position of the phase modulation region corresponding to a QHQ region and an operation characteristic for the phase modulation region in an exemplary embodiment of the invention.

In FIG. 18, a characteristic of a QHQ region corresponding to the phase modulation region is shown. The QHQ region has a structure in which a quarter phase difference plate (a quarter wave plate), a half phase difference plate (a half wave plate), and a quarter phase difference plate (a quarter wave plate) are deposited as a triplet.

The QHQ region of FIG. 18 shows that the liquid crystal molecule arrangement is sequentially formed, differently from an ECB-like mode of FIG. 19.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An image display device comprising:
   a display panel; and
   a liquid crystal lens part disposed on the display panel and which selectively provides a two-dimensional image and a three-dimensional stereoscopic image,
   wherein the liquid crystal lens part comprises a first substrate, a second substrate, and a liquid crystal layer between the first and second substrates,
   wherein the liquid crystal lens part further comprises a first unit zone, a second unit zone adjacent to the first unit zone, and a boundary is defined between the first and second unit zones,
   wherein each of the first and second unit zones comprises a first layer and a second layer disposed on the first substrate as different layers, the first layer comprises a plurality of linear electrodes, and the second layer comprises a plurality of linear electrodes,
   wherein, in each of the first and second unit zones, the linear electrodes in the first layer and the linear electrodes in the second layer make a phase difference provided by the liquid crystal layer either continuously increase or continuously decrease when a voltage is applied thereto,
   wherein the linear electrodes in the first layer are alternately arranged with the linear electrodes in the second layer in each of the first and second unit zones, and
   wherein two adjacent linear electrodes, one of which is a linear electrode closest to the boundary among the linear electrodes in the first unit zone and the other of which is a linear electrode closest to the boundary among the linear electrodes in the second unit zone, respectively, are spaced apart from each other at a first interval when viewed from a top view, which is a plan view in a thickness direction of the liquid crystal lens part, or two adjacent linear electrodes closest to the boundary among the linear electrodes in the second unit zone are spaced apart from each other at a second interval when viewed from the top view.

2. The image display device of claim 1, wherein the first interval is less than a cell gap of the lens liquid crystal layer.

3. The image display device of claim 2, wherein an interval between the boundary and a position of a maximum refractive index in the first unit zone is increased by the two adjacent linear electrodes spaced apart from each other at the first interval when viewed from the top view.

4. The image display device of claim 2, wherein the first substrate of the liquid crystal lens part further comprises a first polarizer,
   the second substrate of the liquid crystal lens part further comprises a second polarizer,
   the lens liquid crystal layer comprises lens liquid crystal molecules, and an angle between a direction of the lens liquid crystal molecules aligned by the first polarizer and a direction of the lens liquid crystal molecules aligned by the second polarizer is greater than zero (0).

5. The image display device of claim 4, wherein
when the angle between the direction of the lens liquid crystal molecules aligned by the first polarizer and the direction of the lens liquid crystal molecules aligned by the second polarizer is referred as a lens inclination, and the phase difference per horizontal distance is referred to as a phase inclination,
the first interval in a unit zone corresponding to a left lens formed by the liquid crystal lens part is substantially slowly decreased as the phase inclination becomes larger when the lens inclination is greater than a predetermined value,
the first interval in the unit zone corresponding to the left lens becomes substantially rapidly decreased as the phase inclination becomes larger when the lens inclination is less than the predetermined value,
the first interval in a unit zone corresponding to a right lens formed by the liquid crystal lens part is substantially slowly decreased as the phase inclination becomes larger when the lens inclination is less than the predetermined value, and
the first interval in the unit zone corresponding to the right lens becomes sharply smaller as the phase inclination becomes larger when the lens inclination is greater than the predetermined value.

6. The image display device of claim 5, wherein
a maximum value of the first interval in the unit zone corresponding to the left lens increases as the lens inclination of the left lens increases, and
a maximum value of the first interval in the unit zone corresponding to the right lens decreases as the lens inclination of the right lens increases.

7. The image display device of claim 2, wherein
the first substrate of the liquid crystal lens part further comprises a first polarizer,
the second substrate of the liquid crystal lens part further comprises a second polarizer,
the lens liquid crystal layer comprises lens liquid crystal molecules, and
an angle between a direction of the lens liquid crystal molecules aligned by the first polarizer and a direction of the lens liquid crystal molecules aligned by the second polarizer is substantially equal to zero (0).

8. The image display device of claim 1, wherein
a minimum phase formation electrode and a second minimum phase formation electrode of the linear electrodes in the second unit zone are spaced apart from each other at the second interval.

9. The image display device of claim 1, wherein
the linear electrodes extend in a direction inclined with respect to a pixel arrangement direction of the display panel.

10. The image display device of claim 9, wherein
the liquid crystal lens part further comprises a plurality of voltage application wires disposed in a non-display area, and
each of the linear electrodes has a portion extending in a direction substantially perpendicular to the pixel arrangement direction in the non-display area of the liquid crystal lens part.

11. The image display device of claim 10, wherein
each of the voltage application wires is connected to a corresponding linear electrode of the linear electrodes.

12. The image display device of claim 1, wherein
the liquid crystal lens part further comprises a cell gap control layer disposed on the first substrate and having inconstant thickness, and
a cell gap of the lens liquid crystal layer is defined by the cell gap control layer.

13. The image display device of claim 12, wherein
the cell gap is greater than two times a cell gap where diffraction efficiency of the liquid crystal lens part is substantially maximum.

14. The image display device of claim 1, wherein
a cell gap of the lens liquid crystal layer is substantially constant, and
the cell gap of the lens liquid crystal layer is determined such that an average of diffraction efficiency value based on a weight value which is a product of the transmittance and an area ratio of each unit zone is substantially maximum.

15. A liquid crystal lens part for a three-dimensional image display device comprising:
a first substrate, a second substrate, and a liquid crystal layer between the first and second substrates; and
a first unit zone, a second unit zone adjacent to the first unit zone, and a boundary of the first and second unit zones,
wherein each of the first and second unit zones comprises a first layer and a second layer disposed on the first substrate as different layers, the first layer comprises a plurality of linear electrodes, and the second layer comprises a plurality of linear electrodes,
wherein, in each of the first and second unit zones, the linear electrodes in the first layer and the linear electrodes in the second layer make a phase difference provided by the liquid crystal layer either continuously increase or continuously decrease when a voltage is applied there,
wherein the linear electrodes in the first layer are alternately arranged with the linear electrodes in the second layer in each of the first and second unit zones, and
wherein two adjacent linear electrodes, one of which is a linear electrode closest to the boundary among the linear electrodes in the first unit zone and the other of which is a linear electrode closest to the boundary among the linear electrodes in the second unit zone, are spaced apart from each other at a first interval when viewed from a top view, which is a plan view in a thickness direction of the liquid crystal lens part, or two adjacent linear electrodes closest to the boundary among the linear electrodes in the second unit zone are spaced apart from each other at a second interval when viewed from the top view.

16. The liquid crystal lens part of claim 15, wherein
the first interval is less than a cell gap of the lens liquid crystal layer.

17. The liquid crystal lens part of claim 16, wherein
an interval between the boundary and a position of a maximum refractive index in the first unit zone is increased by the two adjacent linear electrodes spaced apart from each other at the first interval when viewed from the top view.

18. The liquid crystal lens part of claim 16, wherein
the first substrate of the liquid crystal lens part further comprises a first polarizer,
the second substrate of the liquid crystal lens part further comprises a second polarizer,
the lens liquid crystal layer comprises lens liquid crystal molecules, and an angle between a direction of the lens liquid crystal molecules aligned by the first polarizer and a direction of the lens liquid crystal molecules aligned by the second polarizer is greater than zero (0).

19. The liquid crystal lens part of claim 18, wherein when the angle between the direction of the lens liquid crystal molecules aligned by the first polarizer and the direction of the lens liquid crystal molecules aligned by the second polarizer is referred as a lens inclination, and the phase difference per horizontal distance is referred to as a phase inclination, the first interval in a unit zone corresponding to a left lens formed by the liquid crystal lens part is substantially slowly decreased as the phase inclination becomes larger when the lens inclination is greater than a predetermined value, the first interval in the unit zone corresponding to the left lens becomes substantially rapidly decreased as the phase inclination becomes larger when the lens inclination is less than the predetermined value, the first interval in a unit zone corresponding to a right lens formed by the liquid crystal lens part is substantially slowly decreased as the phase inclination becomes larger when the lens inclination is less than the predetermined value, and the first interval in the unit zone corresponding to the right lens becomes sharply smaller as the phase inclination becomes larger when the lens inclination is greater than the predetermined value.

20. The liquid crystal lens part of claim 19, wherein a maximum value of the first interval in the unit zone corresponding to the left lens increases as the lens inclination of the left lens increases, and a maximum value of the first interval in the unit zone corresponding to the right lens decreases as the lens inclination of the right lens increases.

21. The liquid crystal lens part of claim 16, wherein the first substrate of the liquid crystal lens part further comprises a first polarizer, the second substrate of the liquid crystal lens part further comprises a second polarizer, and an angle between a direction of the lens liquid crystal molecules aligned by the first polarizer and a direction of the lens liquid crystal molecules aligned by the second polarizer is substantially equal to zero (0).

22. The liquid crystal lens part of claim 15, wherein a minimum phase formation electrode and a second minimum phase formation electrode of the linear electrodes in the second unit zone are spaced apart from each other at the second interval.

23. The liquid crystal lens part of claim 15, wherein the linear electrodes extend in a direction included with respect to a pixel arrangement direction of the display panel.

24. The liquid crystal lens part of claim 23, wherein the liquid crystal lens part further comprises a plurality of voltage application wires in a non-display area, and each of the linear electrodes has a portion extending in a direction substantially perpendicular to the pixel arrangement direction in the non-display area of the liquid crystal lens part.

25. The liquid crystal lens part of claim 24, wherein each of the voltage application wires is connected to a corresponding linear electrode of the linear electrodes.

26. The liquid crystal lens part of claim 15, wherein the liquid crystal lens part further comprises a cell gap control layer disposed on the first substrate and having inconstant thickness, and the cell gap of the lens liquid crystal layer is defined by the cell gap control layer.

27. The liquid crystal lens part of claim 26, wherein the cell gap is greater than two times a cell gap where diffraction efficiency of the liquid crystal lens part is substantially maximum.

28. The liquid crystal lens part of claim 15, wherein a cell gap of the lens liquid crystal layer is substantially constant, and the cell gap of the liquid crystal layer is determined such that an average of diffraction efficiency value based on a weight value which is a product of the transmittance and an area ratio of each unit zone is substantially maximum.

* * * * *